United States Patent [19]
Shamoto et al.

[11] Patent Number: 5,801,497
[45] Date of Patent: Sep. 1, 1998

[54] POWER OUTPUT APPARATUS

[75] Inventors: Sumikazu Shamoto, Nagoya; Kaoru Kubo, Aichi-ken, both of Japan

[73] Assignee: Toyota Jidosha Kabushiki Kaisha, Toyota, Japan

[21] Appl. No.: 843,173

[22] Filed: Apr. 14, 1997

[30] Foreign Application Priority Data

Jul. 2, 1996  [JP]  Japan .................... 8-192827

[51] Int. Cl.$^6$ .................... H02K 16/02; B60L 11/02
[52] U.S. Cl. .................... 318/139; 318/140; 180/65.4; 477/3
[58] Field of Search .................... 318/49, 139, 140, 318/830; 290/12, 39; 180/65.1, 65.2, 65.3, 65.4; 477/2, 3, 5

[56]  References Cited

U.S. PATENT DOCUMENTS

| | | | |
|---|---|---|---|
| 3,789,281 | 1/1974 | Shibata . | |
| 5,172,784 | 12/1992 | Varela, Jr. | 180/65.4 |
| 5,513,719 | 5/1996 | Moroto et al. | 180/65.4 |
| 5,562,566 | 10/1996 | Yang | 180/65.2 |

FOREIGN PATENT DOCUMENTS

| | | |
|---|---|---|
| A-53-133814 | 11/1978 | Japan . |
| A-4-183204 | 6/1992 | Japan . |
| A-5-276719 | 10/1993 | Japan . |
| A-7-31007 | 1/1995 | Japan . |
| A-7-75212 | 3/1995 | Japan . |

*Primary Examiner*—Bentsu Ro
*Attorney, Agent, or Firm*—Oliff & Berridge, PLC

[57]  ABSTRACT

In a power output apparatus 10, a complex motor 30 includes a stator 32, a rotor 34 linked with a crankshaft 56 of an engine 50, and a rotor 36 linked with a drive shaft 22, wherein the stator 32 and the rotor 34 constitute a first motor MG1 constructed as an induction motor and the stator 32 and the rotor 36 constitute a second motor MG2 constructed as an induction motor. A driving circuit 92 regulates the frequency of an exciting electric current to be flown through three-phase coils 38 of the stator 32 within a range between the frequency of the rotor 34 and the frequency of the rotor 36. This procedure enables the first motor MG1 and the second motor MG2 to function respectively as a generator and a motor. Electromagnetic energy regenerated by the first motor MG1 is supplied to the second motor MG2 not via the driving circuit 92 but directly from the stator 32. Compared with a system for driving a motor via a driving circuit, such as an inverter, the structure of the present invention enhances the energy efficiency of the power output apparatus 10 and reduces the size of the whole power output apparatus 10.

9 Claims, 19 Drawing Sheets

POWER OUTPUT APPARATUS

BACKGROUND OF THE INVENTION

1. Field of the Invention

The present invention relates to a power output apparatus, and more specifically to a power output apparatus for outputting power from an engine to a drive shaft with a high efficiency.

2. Description of the Prior Art

Proposed power output apparatuses for outputting power to a drive shaft, for example, those mounted on a hybrid electric vehicle, include an engine, a generator attached to an output shaft of the engine, and a motor attached to a drive shaft that is rotatable independently of the output shaft of the engine. The power output from the engine is converted to electrical energy by the generator and then consumed by the motor, so that the power is output to the drive shaft. In such a power output apparatus, the generator and the motor are respectively connected to a battery via inverter circuits that are independently controlled. When there is an excess or a deficiency between the electrical energy obtained by the generator and the electrical energy consumed by the motor, charging or discharging the battery is carried out for the energy balance.

In this known power output apparatus, it is required to convert an alternating current to a direct current and then re-convert the direct current to an alternating current by means of two inverter circuits, in order to supply the electrical energy obtained by the generator to the motor. This procedure undesirably lowers the energy efficiency. With a view to enhancing the energy efficiency of the whole power output apparatus, it is essential to enhance the efficiency of the engine that has the lowest energy efficiency. Namely the engine is required to be driven stationarily at a driving point of the highest possible efficiency. Determination of the driving point of the engine independently of the rotation of the drive shaft causes the frequency of the voltage or the electric current generated by the generator to be different from the frequency of the voltage or the electric current applied to the motor that outputs the power to the drive shaft. Two inverter circuits are accordingly required, in order to supply the voltage or the electric current of a desired frequency to the motor as discussed above.

The applicant has filed a driving system of an electric vehicle (JAPANESE PATENT LAID-OPEN GAZETTE No. 4-183204) as a technique relating to the power output apparatus of the present invention. The driving system includes two coaxial rotors that are respectively attached to left and right wheels and rotatable independently of each other, and a stator that has coils wound thereon and is arranged on the periphery of both the rotors to drive and rotate the rotors.

SUMMARY OF THE INVENTION

One object of the present invention is to provide a power output apparatus having a higher energy efficiency.

Another object of the present invention is to reduce the size of the power output apparatus.

At least part of the above and the other related objects is realized by a first power output apparatus of the present invention for outputting power to a drive shaft, which includes: an engine having an output shaft; a complex motor comprising a stator having multi-phase coils wound thereon, a first rotor connecting with the output shaft of the engine, and a second rotor connecting with the drive shaft, wherein the stator and the first rotor constitute a first motor that can carry out a regenerative operation and the stator and the second rotor constitute a second motor, at least either one of the first motor and the second motor being constructed as a non-synchronous motor; a motor-driving circuit for regulating an exciting electric current flown through the multi-phase coils wound on the stator of the complex motor, thereby driving the first motor and the second motor in the complex motor; and control means for driving and controlling the first motor and the second motor via the motor-driving circuit, so as to enable at least part of power output from the engine to be output to the drive shaft.

In the first power output apparatus of the present invention, the two rotors of the first motor and the second motor included in the complex motor are driven by regulating the exciting electric current flown through the coils wound on the stator. This enables the first motor and the second motor to output the power output from the engine to the drive shaft. This structure requires only one driving circuit for driving the two motors and thus effectively reduces the energy loss, thereby enhancing the energy efficiency of the whole power output apparatus.

In accordance with one preferable application of the first power output apparatus, the control means includes means for controlling the first motor and the second motor, in order to enable the first motor to regenerate at least part of the power output from the engine as an electromagnetic energy and in order to enable the second motor to be driven with at least part of the regenerative electromagnetic energy. This structure enables the power output from the engine to be supplied from the first motor to the second motor in the form of electromagnetic energy. The electromagnetic energy is then output as mechanical energy to the drive shaft by means of the second motor.

In accordance with another preferable application of the first power output apparatus, the second motor in the complex motor is constructed as a non-synchronous motor, and the first motor in the complex motor is constructed as a non-synchronous motor having specific torque-slip characteristics that give a higher torque than that of the second motor at a slip in a predetermined range. The difference in characteristics between the first motor and the second motor enables each motor to carry out a desired operation at a slip in a predetermined range.

In the first power output apparatus including the first motor having the higher slip-torque characteristics in the predetermined range, the predetermined range is a range in the vicinity of a value '1'. In this structure, it is preferable that the first power output apparatus further includes starting time control means activated in place of the control means when a predetermined starting instruction is given while both the output shaft of the engine and the drive shaft are at a stop, the starting time control means controlling the first motor and the second motor via the motor-driving circuit, in order to enable the first motor to output a torque for rotating and driving o the output shaft of the engine and in order to enable the second motor to output a torque of not greater than a predetermined value. Especially when the predetermined value represents a value of a torque corresponding to a stationary friction of the drive shaft, the power output apparatus can start the engine while keeping the drive shaft at a stop.

In accordance with still another preferable application, the first power output apparatus further includes reverse time control means for, when an instruction is given to rotate the drive shaft in reverse of a rotation of the output shaft, regulating the motor-driving circuit, so as to invert a phase sequence of an exciting electric current flown through the multi-phase coils wound on the stator of the complex motor. This structure enables the drive shaft to be driven in a reverse direction.

In the first power output apparatus having the reverse time control means, it is preferable that the second motor in the complex motor is constructed as a non-synchronous motor and that the reverse time control means has means for regulating the exciting current in order to keep a slip in a range of 0 to 1 while the second motor is driven to carry out a power operation in a reverse direction.

In accordance with another preferable application of the first power output apparatus, the second motor in the complex motor is constructed as a motor that can carry out a regenerative operation. In this structure, the first power output apparatus further includes braking time control means for, when an instruction is given to brake the drive shaft, regulating an exciting electric current flown through the multi-phase coils wound on the stator of the complex motor via the motor-driving circuit, so as to enable a braking force to be applied to the drive shaft through the regenerative operation of the second motor in the complex motor. This structure enables regeneration of kinetic energy at the time of braking, thereby further enhancing the energy efficiency of the whole power output apparatus.

The present invention is also directed to a second power output apparatus for outputting power to a drive shaft, which includes: an engine having an output shaft; a complex motor comprising a stator having multi-phase coils wound thereon, a first rotor connecting with a rotating shaft, and a second rotor connecting with either one of the output shaft of the engine and the drive shaft, wherein the stator and the first rotor constitute a first motor that can carry out a regenerative operation and the stator and the second rotor constitute a second motor, at least either one of the first motor and the second motor being constructed as a non-synchronous motor; three-shaft-type input and output means having three shafts respectively connecting with the output shaft, the rotating shaft, and the drive shaft, the three-shaft-type input and output means determining powers input into and output from a residual one shaft based on predetermined powers input into and output from any two shafts among the three shafts; a motor-driving circuit for regulating an exciting electric current flown through the multi-phase coils wound on the stator of the complex motor, thereby driving the first motor and the second motor in the complex motor; and control means for driving and controlling the first motor and the second motor via the motor-driving circuit, so as to enable the three-shaft-type power input and output means and the first motor and the second motor in the complex motor to output at least part of power output from the engine to the drive shaft.

In the second power output apparatus of the present invention, the power output from the engine can be output to the drive shaft via the three-shaft-type input and output means and the first motor and the second motor in the complex motor. The two rotors of the first motor and the second motor included in the complex motor are driven by regulating the exciting electric current flown through the coils wound on the stator. This structure requires only one driving circuit for driving the two motors and thus effectively reduces the energy loss, thereby enhancing the energy efficiency of the whole power output apparatus.

DESCRIPTION OF THE PREFERRED EMBODIMENTS

Figure 1:
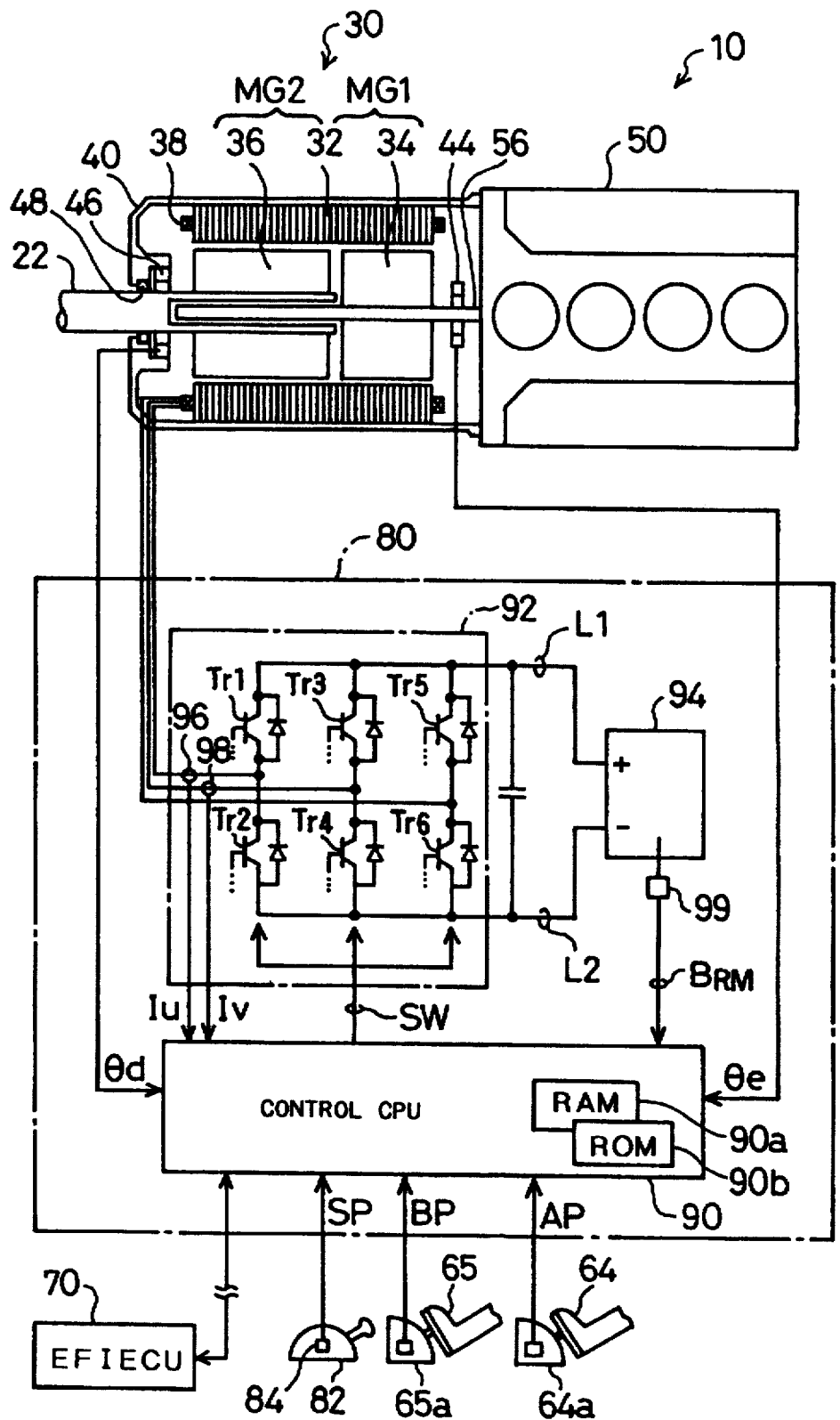
FIG. 1 schematically illustrates structure of a power output apparatus 10 as a first embodiment according to the present invention.
Figure 2:
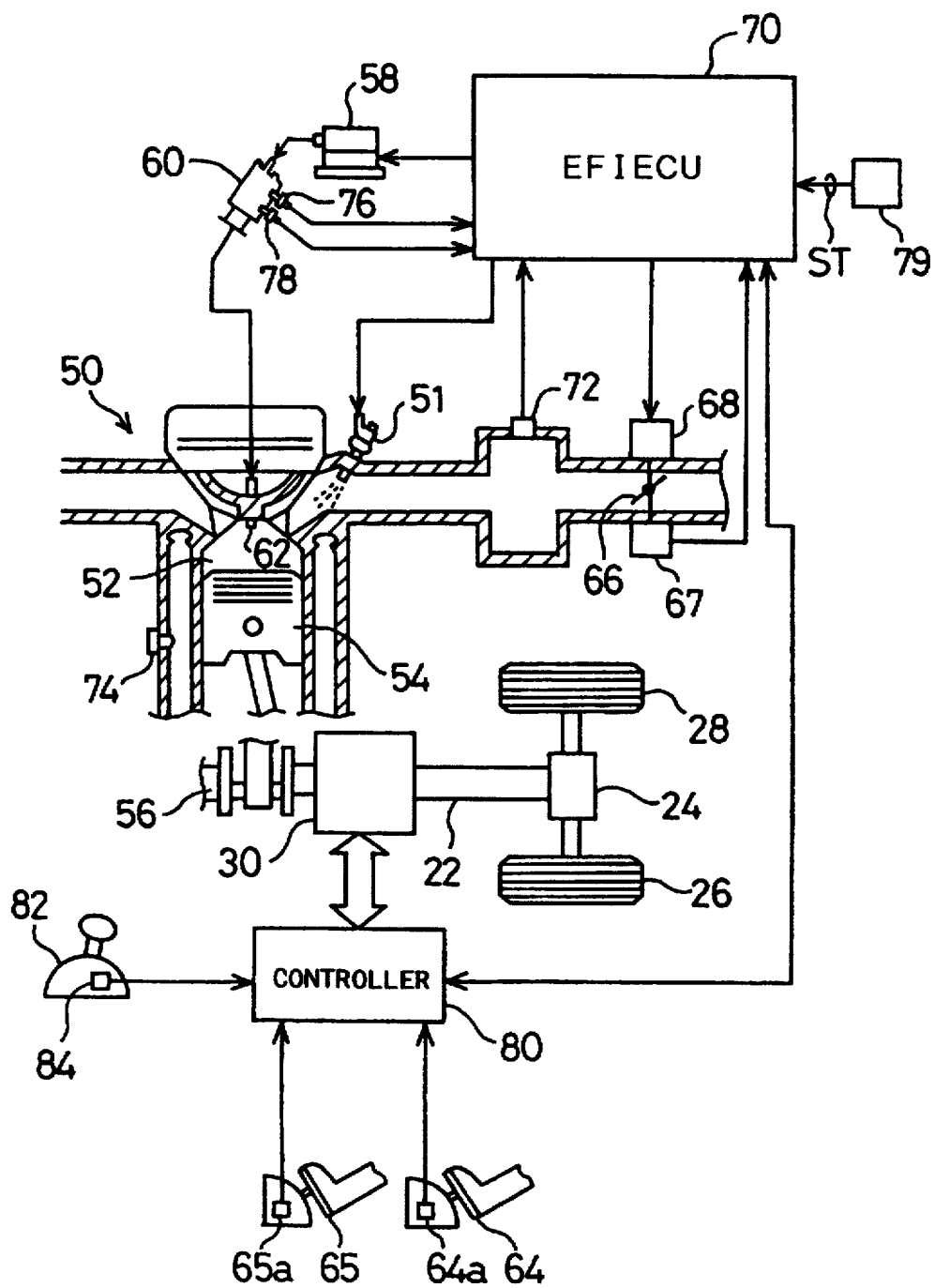
FIG. 2 schematically illustrates a general structure of a vehicle having the power output apparatus 10 of the first embodiment incorporated therein.

Some modes of carrying out the present invention are described below as preferred embodiments. FIG. 1 schematically illustrates structure of a power output apparatus 10 as a first embodiment according to the present invention; and FIG. 2 schematically illustrates a general structure of a vehicle having the power output apparatus 10 of the first embodiment incorporated therein. The general structure of the vehicle is described first for the convenience of explanation.

Referring to FIG. 2, the vehicle is provided with an engine 50 driven by gasoline as a power source. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle position sensor 67 for detecting a valve travel or position of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed (the number of revolutions per a predetermined time period) and the rotational angle of the crankshaft 56. A starter switch 79 for detecting a starting condition ST of an ignition key (not shown) is also connected to the EFIECU 70. Other sensors and switches connecting with the EFIECU 70 are omitted from the illustration.

The crankshaft 56 of the engine 50 is linked with a drive shaft 22 via a complex motor 30 (described later in detail). The drive shaft 22 further connects with a differential gear 24, which eventually transmits the torque output from the drive shaft 22 of the power output apparatus 10 to left and right driving wheels 26 and 28. The complex motor 30 is driven and controlled by a controller 80. The controller 80 includes an internal control CPU and receives inputs from a gearshift position sensor 84 attached to a gearshift 82, an accelerator pedal position sensor 64a attached to an accelerator pedal 64, and a brake pedal position sensor 65a attached to a brake pedal 65. The detailed structure of the controller 80 will be described later. The controller 80 sends and receives a variety of data and information to and from the EFIECU 70 through communication. Details of the control procedure including a communication protocol will be described later.

Figure 3A:
FIGS. 3(a) and 3(b) illustrate exemplified shapes of rotor bars of an ordinary squirrel-cage induction motor and a special double squirrel-cage induction motor.
Figure 3B:
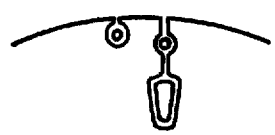
Figure 4:
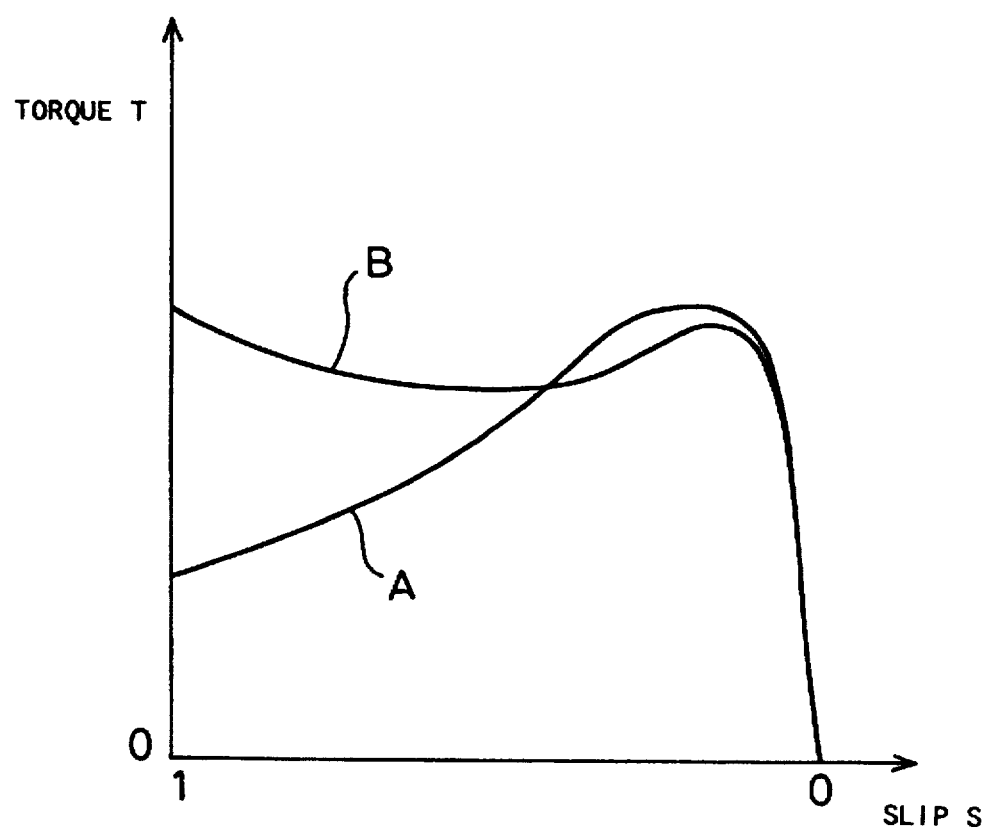
FIG. 4 is a graph showing the torque-slip characteristics of the ordinary squirrel-cage induction motor and the special double squirrel-cage induction motor.

Referring to FIG. 1, the complex motor 30 includes a stator 32 having three-phase coils (U, V, and W phases) 38 wound on slots, a rotor 34 connected with the crankshaft 56 of the engine 50, and a rotor 36 connected with the drive shaft 22. The stator 32 and the rotor 34 constitute a first motor MG1, whereas the stator 32 and the rotor 36 constitute a second motor MG2. The stator 32 is constructed by laminating thin sheets of non-directional electromagnetic steel. The first motor MG1 is structured as a special double squirrel-cage induction motor that can carry out the regenerative operation and output high torques at low revolving speeds of the rotor. The second motor MG2 is structured as an ordinary squirrel-cage induction motor. FIGS. 3(a) and 3(b) illustrate exemplified shapes of rotor bars of then ordinary squirrel-cage induction motor and the special double squirrel-cage induction motor. FIG. 4 is a graph showing the torque-slip characteristics of the ordinary squirrel-cage induction motor and the special double squirrel-cage induction motor. In the graph of FIG. 4, curves A and B respectively represent the torque-slip characteristics of the ordinary squirrel-cage induction motor and those of the special double squirrel-cage induction motor.

A resolver 44 for measuring a rotational angle θe of the crankshaft 56 is mounted on the crankshaft 56, and a resolver 46 for measuring a rotational angle θd of the drive shaft 22 is mounted on the drive shaft 22. The resolver 44 may also work as the angle sensor 78 attached to the distributor 60. The drive shaft 22 is supported by a bearing 48 attached to a casing 40.

As mentioned above, the complex motor 30 is driven and controlled by the controller 80. Referring back to FIG. 1, the controller 80 includes a driving circuit 92 for driving the complex motor 30, a control CPU 90 for controlling the driving circuit 92, and a battery 94 including a number of secondary cells. The control CPU 90 is a one-chip microprocessor including a RAM 90a used as a working memory, a ROM 90b in which a variety of processing programs are stored, an input/output port (not shown), and a serial communication port (not shown) through which data are sent to and received from the EFIECU 70. The control CPU 90 receives a variety of data via the input port. The input data include the rotational angle θe of the crankshaft 56 of the engine 50 measured with the resolver 44, the rotational angle θd of the drive shaft 22 measured with the resolver 46, an accelerator pedal position AP (step-on amount of the accelerator pedal 64) output from the accelerator pedal position sensor 64a, a brake pedal position BP (step-on amount of the brake pedal 65) output from the brake pedal position sensor 65a, a gearshift position SP output from the gearshift position sensor 84, phase currents Iu and Iv measured with two ammeters 96 and 98 disposed in the driving circuit 92, and a remaining charge BRM of the battery 94 measured with a remaining charge meter 99. The remaining charge meter 99 may determine the remaining charge BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a control signal SW for driving six transistors Tr1 through Tr6 working as switching elements in the driving circuit 92. The six transistors Tr1 through Tr6 in the driving circuit 92 constitute a transistor inverter and are arranged in pairs to work as a source and a drain with respect to a pair of power lines L1 and L2. Each phase coil of the three-phase coils 38 in the complex motor 30 is connected to each contact of the paired transistors. The power lines L1 and L2 are respectively connected to plus and minus terminals of the battery 94. The control signal SW output from the control CPU 90 thus successively controls the power-on time of the paired transistors Tr1 through Tr6. The electric current flowing through each phase coil of the three-phase coils 38 is PWM (pulse width modulation) controlled to give a quasi-sine wave, which enables the three-phase coils 38 to form a revolving magnetic field.

The power output apparatus 10 of the first embodiment thus constructed follows an operation principle discussed below. By way of example, it is assumed that the engine 50 is driven at a revolving speed Ne and that the drive shaft 22 rotates at a revolving speed Nd that is lower than the revolving speed Ne. Under such conditions, a rotational frequency $\omega 1$ of the rotor 34 included in the first motor MG1 of the complex motor 30 is equal to a rotational frequency $\omega e$ of the crankshaft 56 of the engine 50. When the revolving speed Ne is expressed by the unit of rpm, the rotational frequency $\omega 1$ is calculated as $2\pi Ne/60$. A rotational frequency $\omega 2$ of the rotor 36 included in the second motor MG2 of the complex motor 30 is equal to a rotational frequency of the drive shaft 22 and is thereby calculated as $2\pi Nd/60$. Since Ne>Nd, $\omega 1 > \omega 2$.

Figure 5:
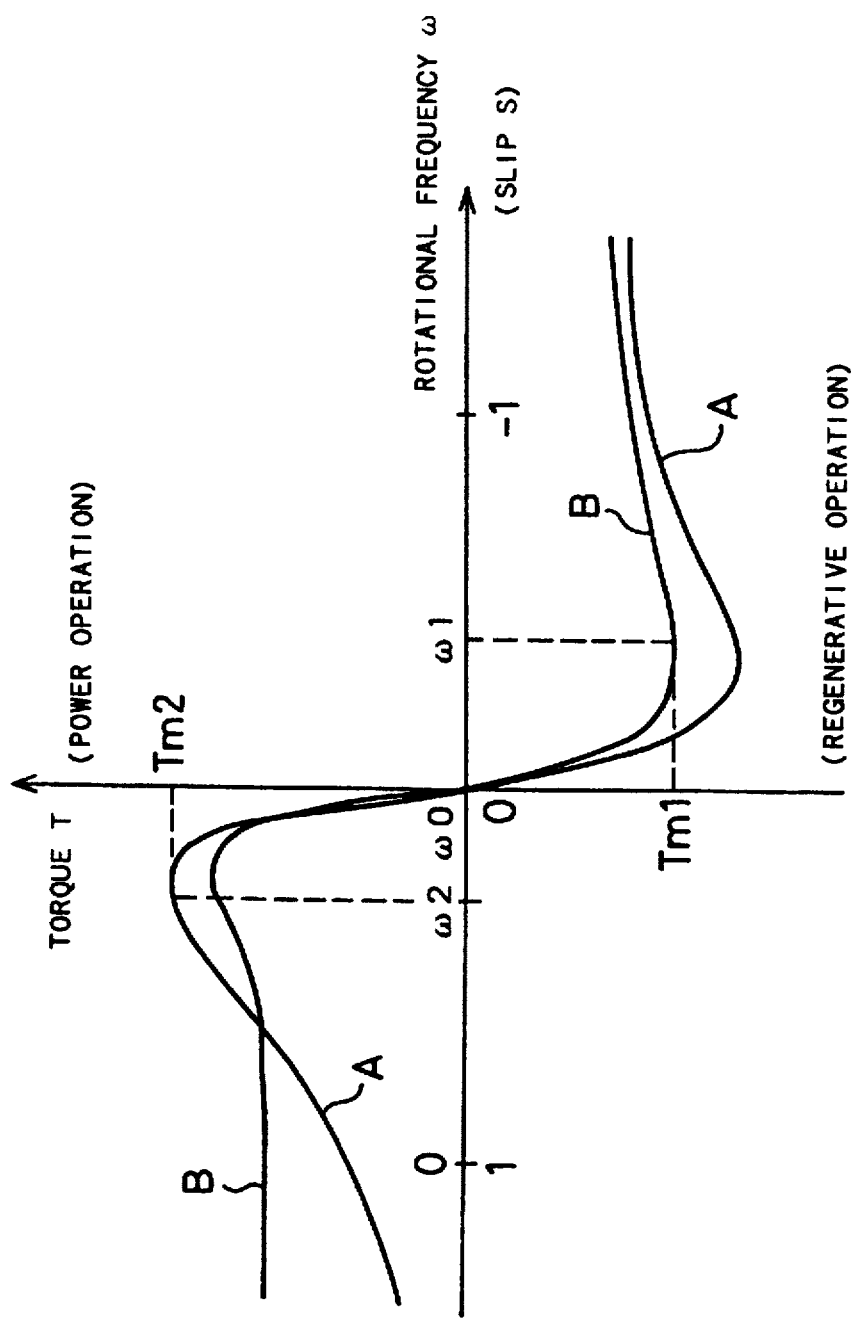
FIG. 5 is a graph showing torque-slip characteristics of the first motor MG1 and the second motor MG2 under the condition of $\omega 1 > \omega 0 > \omega 2$.

In this state, an exciting current flown through the three-phase coils 38 is regulated by the switching operation of the transistors Tr1 through Tr6 in the driving circuit 92, in order to enable a frequency $\omega 0$ of a revolving magnetic field of the stator 32 included in the complex motor 30 to satisfy $\omega 1 > \omega 0 > \omega 2$. FIG. 5 is a graph showing the torque-slip characteristics of the first motor MG1 and the second motor MG2 in this state. Referring to FIG. 5, since a slip s1 expressed as Equation (1) given below has a negative value, the first motor MG1 works as a generator according to the Fleming's right-hand rule and takes out a mechanical energy Pe output from the engine 50 to the crankshaft 56 as an electromagnetic energy P1. A slip s2 expressed as Equation (2) given below is, on the other hand, in a range of 0 to 1, so that the second motor MG2 works as a motor according to the Fleming's left-hand rule and outputs an electromagnetic energy P2 supplied via the stator 32 to the drive shaft 22 as a mechanical energy Pd.

$$s1 = \frac{\omega 0 - \omega 1}{\omega 0} \quad (1)$$

$$s2 = \frac{\omega 0 - \omega 2}{\omega 0} \quad (2)$$

In this state, both the regeneration of the electromagnetic energy P1 by the first motor MG1 and the consumption of the electromagnetic energy P2 by the second motor MG2 are carried out via the stator 32. Provided that a certain loss, for example, in the driving circuit 92 is neglected, a difference between the electromagnetic energy P1 and the electromagnetic energy P2 represents the electrical energy transmitted to and from the battery 94 via the three-phase coils 38 and the driving circuit 92. When the electromagnetic energy P1 regenerated by the first motor MG1 is greater than the electromagnetic energy P2 consumed by the second motor MG2, the electromagnetic energy P1 is directly supplied to the second motor MG2 via the stator 32 while a residual electromagnetic energy defined by (P1-P2) is supplied to the battery 94 via the three-phase coils 38 and the driving circuit 92. When the electromagnetic energy P1 is smaller than the electromagnetic energy P2, on the contrary, the electromagnetic energy P1 directly supplied to the second motor MG2 via the stator 32 is not sufficient for the required electromagnetic energy P2. Energy defined by (P2-P1) is accordingly supplied from the battery 94 via the three-phase coils 38 and the driving circuit 92.

Both the first motor MG1 and the second motor MG2 are induction motors as mentioned above. The electromagnetic energy P1 regenerated by the first motor MG1 is thus expressed as a function, wherein variables are a value I0 of the exciting current flown through the three-phase coils 38 of the stator 32 and the slip s1. The electromagnetic energy P2 consumed by the second motor MG2 is expressed as a function, wherein the value I0 of the exciting current flown through the three-phase coils 38 and the slip s2. The slips s1 and s2 are respectively defined by the above Equations (1) and (2). In a stationary state wherein the rotational frequency $\omega 1$ of the rotor 34 in the first motor MG1 and the rotational frequency $\omega 2$ of the rotor 36 in the second motor MG2 are fixed, that is, wherein the revolving speed Ne of the engine 50 and the revolving speed Nd of the drive shaft 22 are fixed, both the slips s1 and s2 depend upon the rotational frequency $\omega 0$ of the revolving magnetic field of the stator 32. The electromagnetic energy P1 is accordingly expressed by the value I0 of the exciting current flown through the three-phase coils 38 of the stator 32 and the frequency $\omega 0$ of the revolving magnetic field of the stator 32 as variables. The electromagnetic energy P2 is also expressed by the value I0 of the exciting current flown through the three-phase coils 38 and the frequency $\omega 0$ of the revolving magnetic field of the stator 32 as variables. Namely both the electromagnetic energy P1 regenerated by the first motor MG1 and the electromagnetic energy P2 consumed by the second motor MG2 can be controlled by regulating the value I0 of the exciting current flown through the three-phase coils 38 of the stator 32 and the frequency $\omega 0$ thereof.

The following describes concrete operations of the power output apparatus 10, which follows the fundamental operation principle discussed above. The power output apparatus 10 carries out different operations in connection with the state of the vehicle, on which the power output apparatus 10 is mounted. A control procedure in an ordinary driving state of the vehicle is described first based on a processing routine in a stationary driving condition shown in the flowchart of FIG. 6. This routine is repeatedly executed at predetermined time intervals, for example, 10 msec, after the engine 50 of the vehicle has started.

Figure 6:
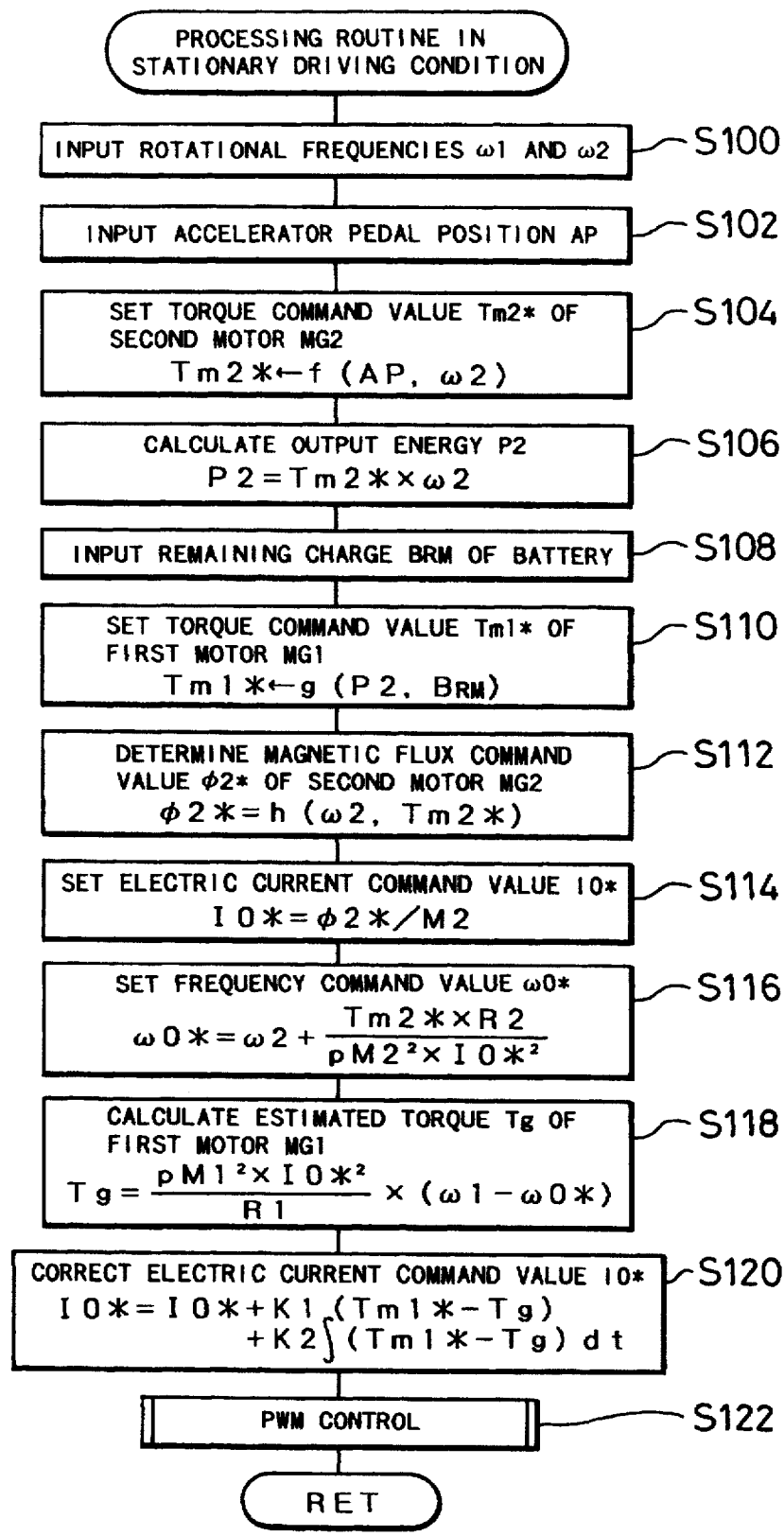
FIG. 6 is a flowchart showing a processing routine in a stationary driving condition executed by the control CPU 90 of the controller 80.

When the program enters the routine of FIG. 6, the control CPU 90 of the controller 80 first reads the rotational frequency $\omega 1$ of the first motor MG1 and the rotational frequency $\omega 2$ of the second motor MG2 in the complex motor 30 at step S100. The rotational frequency $\omega 1$ of the first motor MG1 may be calculated from the rotational angle $\theta e$ of the engine 50 read from the resolver 44 attached to the crankshaft 56, whereas the rotational frequency $\omega \theta$ of the second motor MG2 may be calculated from the rotational angle ed of the drive shaft 22 read from the resolver 46 attached to the drive shaft 22. The control CPU 90 then reads the accelerator pedal position AP detected by the accelerator pedal position sensor 64a at step S102. The driver steps on the accelerator pedal 64 when feeling insufficiency of the output torque. The value of the accelerator pedal position AP accordingly represents the desired output torque (that is, the torque to be output to the drive shaft 22) which the driver requires.

Figure 7:
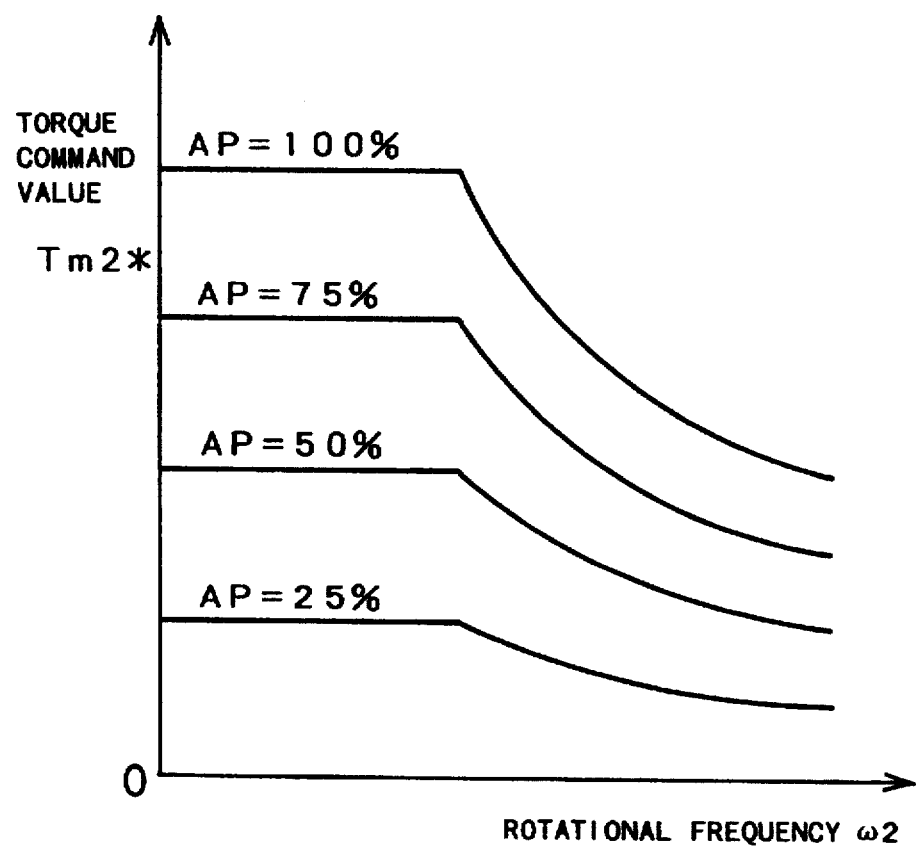
FIG. 7 shows a map illustrating the relationship between the torque command value Tm2*, the rotational frequency $\omega 2$, and the accelerator pedal position AP.

The control CPU 90 determines a torque command value Tm2* to be output from the second motor MG2, based on the input accelerator pedal position AP and the input rotational frequency $\omega 2$ of the second motor MG2 at step S104. In this embodiment, torque command values Tm2* are set in advance for the respective values of the accelerator pedal position AP and the rotational frequency $\omega 2$ of the second motor MG2 and stored as a map in the ROM 90b. In accordance with a concrete procedure, at step S104, the torque command value Tm2* corresponding to the input accelerator pedal position AP and the input rotational frequency ω2 is read from the map stored in the ROM 90b. FIG. 7 illustrates such a map as an example.

Figure 8:
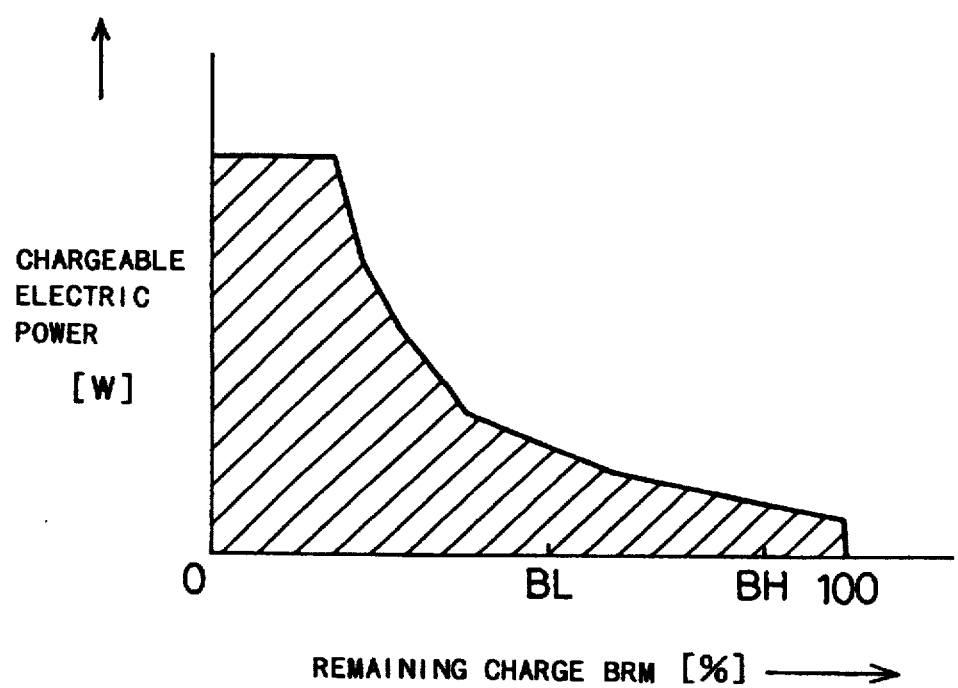
FIG. 8 is a graph showing the relationship between the remaining charge BRM the battery 94 and the chargeable electric power.

At subsequent step S106, the control CPU 90 calculates an energy P2 output from the second motor MG2 to the drive shaft 22 by multiplying the torque command value Tm2* of the second motor MG2 by the rotational frequency ω2. The control CPU 90 then reads the remaining charge BRM of the battery 94 measured with the remaining charge meter 99 at step S108, and sets a torque command value Tm1* of the first motor MG1 based on the calculated output energy P2 and the input remaining charge BRM of the battery 94 at step S110. The torque command value Tm1* of the first motor MG1 is set based on the output energy P2 and the remaining charge BRM of the battery 94, in order to regulate the charge and discharge of the battery 94. Namely this procedure prevents the battery 94 from being charged or discharged to an extreme degree and keeps the remaining charge BRM of the battery 94 within a predetermined range. FIG. 8 is a graph showing the relationship between the remaining charge BRM of the battery 94 and the chargeable electric power as an example. In the graph of FIG. 8, threshold values BL and BH respectively denote a lower limit value and an upper limit value of a predetermined appropriate range of the remaining charge BRM of the battery 94. The following describes the procedure of setting the torque command value Tm1* of the first motor MG1 in connection with the driving points of the engine 50 and the operation control of the engine 50.

In the structure of the power output apparatus 10 of the embodiment, the engine 50 can be driven irrespective of the operation of the drive shaft 22 and thereby driven stationarily at a driving point of the highest possible energy efficiency. This structure also allows the engine 50 to be intermittently driven by taking into account the remaining charge BRM of the battery 94. In this embodiment, available driving points of the engine 50 include a driving point DP1 having the highest possible energy efficiency, a driving point DP2 for outputting a large energy to abruptly charge the battery 94, and a driving point DP3 for outputting a relatively small energy. Namely the engine 50 is either at a stop or driven at one of these three driving points in this embodiment.

The torque of the first motor MG1 represents a loading torque of the engine 50. In order to drive the engine 50 stationarily at a predetermined driving point, the torque of the first motor MG1 is not allowed to vary but is required to be fixed to a value identical with any one of the output torques of the engine 50 at the three driving points DP1 through DP3 or zero (when the engine 50 is at a stop). The processing of step S110 accordingly sets the torque command value Tm1* of the first motor MG1 equal to any one of the four values including zero. In this embodiment, torque command values Tm1* are set in advance for the respective values of the remaining charge BRM of the battery 94 and the output energy P2 by taking into account the performance of the engine 50, the output energy at each driving point, and the capacity of the battery 94, and stored as a map (not shown) in the ROM 90b. In accordance with a concrete procedure, at step S110, the torque command value Tm1* corresponding to the input remaining charge BRM of the battery 94 and the calculated output energy P2 is read from the map stored in the ROM 90b. Although not being specifically illustrated, in the power output apparatus 10 of the embodiment, when the torque command value Tm1* of the first motor MG1 is set, the control CPU 90 transmits the setting of the torque command value Tm1* to the EFIECU 70 through communication. The EFIECU 70 receiving the torque command value Tm1* sets the driving point of the engine 50 based on the torque command value Tm1* and controls the position of the throttle valve 66 and the amount of the fuel injected from the fuel injection valve 51, in order to enable the engine 50 to be driven at the preset driving point.

After setting the torque command value Tm1* of the first motor MG1 at step S110, the control CPU 90 determines a magnetic flux command value $\phi2^*$ of the second motor MG2 based on the rotational frequency ω2 and the torque command value Tm2* of the second motor MG2 at step S112. In order to enable the second motor MG2 driven at the rotational frequency ω2 to output the torque given as the torque command value Tm2*, it is required to make the magnetic flux of the stator 32 corresponding to the torque. The magnetic flux is proper to the motor and can be determined in advance by analyzing the motor. In this embodiment, magnetic flux command values $\phi2^*$ are determined for the respective rotational frequencies ω2 and the torque command values Tm2* and stored in advance as a map (not shown) in the ROM 90b. In accordance with a concrete procedure, at step S112, the magnetic flux command value $\phi2^*$ corresponding to the input rotational frequency ω2 and the preset torque command value Tm2* is read from the map stored in the ROM 90b.

Figure 9:
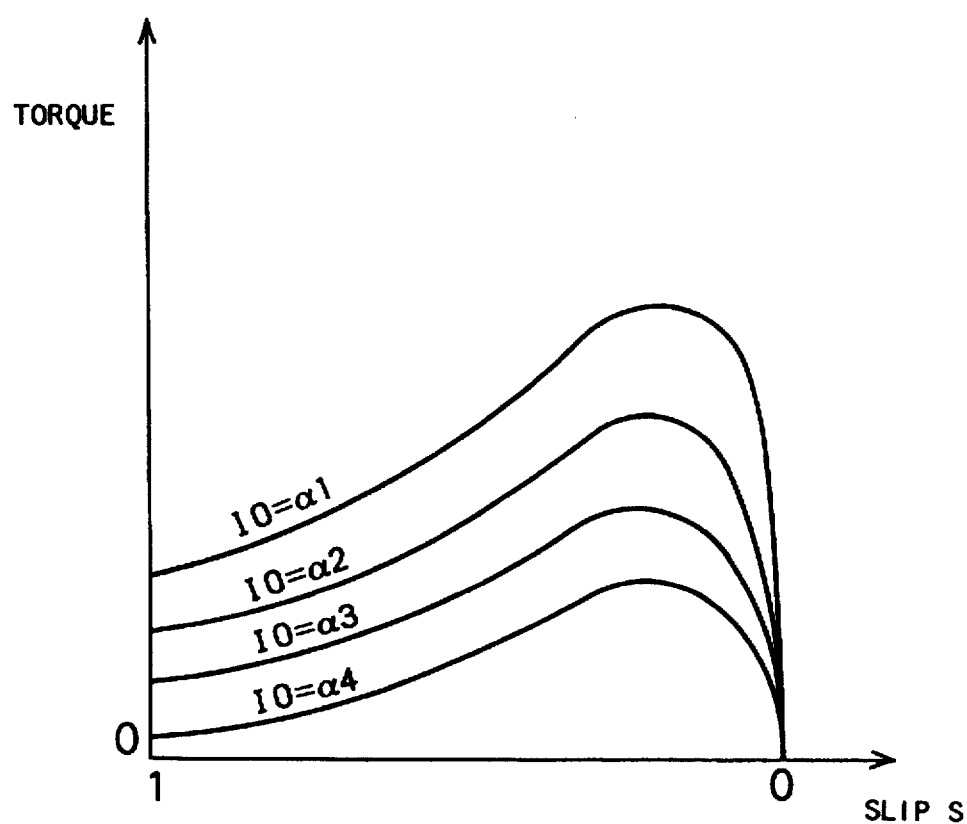
FIG. 9 is a graph showing a variation in torque-slip characteristics of the second motor MG2 with a variation in current value I0 of the exciting current flown through the three-phase coils 38.

After obtaining the magnetic flux command value $\phi2^*$, the control CPU 90 calculates an electric current command value I0* of the exciting current to be flown through the three-phase coils 38 of the stator 32 according to Equation (3) at step S114. 'M' in Equation (3) represents a mutual inductance of the second motor MG2. FIG. 9 is a graph showing torque-slip characteristics curves of the second motor MG2 with respect to a variety of current values I0 of the exciting current flowing through the three-phase coils 38. The current values I0 decrease in the order of α1>α2>α3>α4. In the induction motor, the torque-slip characteristics of the motor are varied with a variation in value of the exciting current flown through the three-phase coils of the stator. The motor can thus be driven with a high efficiency by regulating the value of the exciting current flown through the three-phase coils and the slip for the required torque. The procedure of setting the magnetic flux command value $\phi2^*$ at step S112 and setting the electric current command value I0* at step S114 accordingly represents the procedure of setting the current value I0 that is one of the variables for driving the second motor MG2 with a high efficiency.

$$I0^* = \frac{\phi2^*}{M2} \quad (3)$$

The control CPU 90 then calculates a frequency command value ω0* that represents the frequency of the exciting current to be flown through the three-phase coils 38 of the stator 32 according to Equation (4) given below at step S116. Equation (4) used to determine the frequency command value ω0* is obtained by substituting Equations (5) and (6) given below and Equation (3) used at step S114 into Equation (7) representing the relationship between the frequency command value ω0* and the rotational frequency ω2. Equation (5) calculates a torque current Iq2* of the second motor MG2 from the magnetic flux command value $\phi2^*$ and the torque command value Tm2*, whereas Equation (6) calculates a slip frequency ωs2* of the second motor MG2 from the torque current Iq2* and the magnetic flux command value $\phi 2^*$. In Equations (4) through (6), 'p', 'L2', and 'R2' respectively denote a polar number, a secondary inductance, and a secondary resistance of the second motor MG2.

$$\omega 0^* = \omega 2 + \frac{Tm2^* \times R2}{p \times M2^2 \times I0^{*2}} \quad (4)$$

$$Iq2^* = \frac{Tm2^* \times L2}{P \times M2 \times \phi 2^*} \quad (5)$$

$$\omega s2^* = \frac{M2 \times R2}{L2 \times \phi 2^*} \times Iq2^* \quad (6)$$

$$\omega 0^* = \omega 2 + \omega s2^* \quad (7)$$

The control CPU 90 of the controller 80 subsequently determines an estimated torque Tg according to Equation (8) given below at step S118. The estimated torque Tg is a torque applied to the first motor MG1 when the electric current having the frequency equal to the frequency command value $\omega 0^*$ and the magnitude equal to the electric current command value I0* is flown through the three-phase coils 38 of the stator 32. Equation (8) used to calculate the estimated torque Tg is obtained by substituting Equations (9), (10), and (11) given below into Equation (12) for calculating the estimated torque Tg from a magnetic flux command value $\phi 1^*$ and a torque current Iq1*. Equation (9) calculates the magnetic flux command value $\phi 1^*$ of the first motor MG1 from the electric current command value I0*; Equation (10) calculates a slip frequency $\omega s1$ of the first motor MG1 at the frequency command value $\omega 0^*$; and Equation (11) calculates the torque current Iq1* of the first motor MG1 from the slip frequency $\omega 1$ and the magnetic flux command value $\phi 1^*$. In Equations (8) through (12), 'p', 'M1', 'L1', and 'R1' respectively denote a polar number, a mutual inductance, a secondary inductance, and a secondary resistance of the first motor MG1.

$$Tg = \frac{P \times M1^2 \times I0^{*2}}{R1} \times (\omega 1 - \omega 0^*) \quad (8)$$

$$\phi 1^* = M1 \times I0^* \quad (9)$$

$$\omega s1 = \omega 1 - \omega 0^* \quad (10)$$

$$Iq1^* = \omega s1 \times \frac{L1 \times \phi 1^*}{M1 \times R1} \quad (11)$$

$$Tg = \frac{p \times M1 \times I0^*}{L1} \times Iq1^* \quad (12)$$

After obtaining the estimated torque Tg of the first motor MG1, the control CPU 90 corrects the electric current command value I0* according to Equation (13) given below, in order to make the torque of the first motor MG1 approach to the torque command value Tm1* at step S120. 'I0*' in the first term on the right side of Equation (13) is obtained at step S114. The second term on the right side represents a correction term based on the difference between the torque command value Tm1* and the estimated torque Tg, wherein 'K1' denotes a proportional constant. The third term on the right side represents an integral term to cancel the stationary difference, wherein 'K2' denotes a proportional constant.

$$I0^* = I0^* + K1(Tm1^* - Tg) + K2\int(Tm1^* - Tg)dt \quad (13)$$

After setting the frequency command value $\omega 0^*$ and the electric current command value I0* of the exciting current to be flown through the three-phase coils 38 of the stator 32, the control CPU 90 PWM (pulse width modulation) controls the on-time of the transistors Tr1 through Tr6 in the driving circuit 92, in order to make the preset electric current flow through the three-phase coils 38 at step S122. The switching control of the transistors Tr1 through Tr6 in the driving circuit 92 enables the electric current having the frequency equal to the frequency command value $\omega 0^*$ and the magnitude equal to the electric current command value I0* to flow through the three-phase coils 38, and thereby forms a revolving magnetic field having the frequency equal to the frequency command value $\omega 0^*$ in the stator 32. The first motor MG1 is accordingly controlled to carry out the regenerative operation and have the torque equal to the torque command value Tm1*, whereas the second motor MG2 is controlled to carry out the power operation and have the torque equal to the torque command value Tm2*, as discussed previously with the drawing of FIG. 5. This results in outputting the torque equal to the torque command value Tm2* to the drive shaft 22.

As discussed above, the power output apparatus 10 of the first embodiment executes the processing routine in the stationary driving condition and controls the driving circuit 92 to regulate the frequency $\omega 0$ of the revolving magnetic field generated in the stator 32. The regulation of the frequency $\omega 0$ enables the regenerative operation of the first motor MG1 and the power operation of the second motor MG2 in the complex motor 30, thereby allowing a desired power to be output to the drive shaft 22. The electromagnetic energy P1 regenerated by the first motor MG1 is supplied directly to the second motor MG2 via the stator 32. Compared with the structure that supplies the energy to the motor via two driving circuits, such as inverters, the structure of this embodiment enhances the energy efficiency. The structure of the first embodiment uses only one driving circuit to control both the first motor MG1 and the second motor Mg2, thereby decreasing the required number of parts and reducing the size of the whole power output apparatus 10.

In the processing routine in the stationary driving condition of the embodiment, the torque command value Tm1* of the first motor MG1 is set based on the output energy P2 and the remaining charge BRM of the battery 94, and the engine 50 is driven at a plurality of driving points. In accordance with another possible application, however, the operation control of the engine 50 may be an on-off control to drive the engine 50 at an only driving point (for example, a driving point of the highest possible energy efficiency) or to stop the engine 50, based on, for example, the remaining charge BRM of the battery 94. In case that the engine 50 is being driven, the value of the torque at the driving point is set to the torque command value Tm1* of the first motor MG1. In case that the engine 50 is at a stop, on the contrary, the torque command value Tm1* of the first motor MG1 is set equal to zero. In accordance with still another possible application, the driving point of the engine 50 is varied with a variation in accelerator pedal position AP, and the value of the torque at the driving point is set to the torque command value Tm1* of the first motor MG1.

Figure 10:
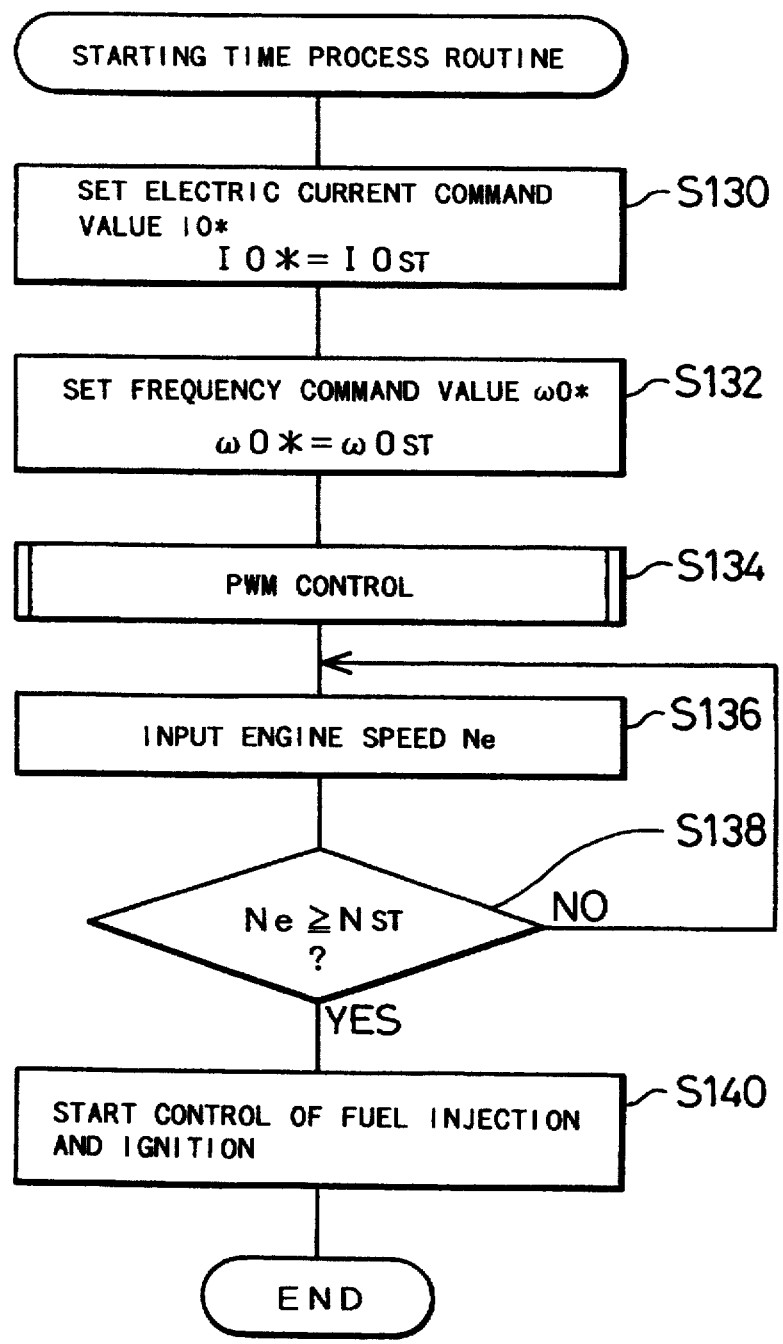
FIG. 10 is a flowchart showing a starting time process routine executed by the control CPU 90 of the controller 80.
Figure 11:
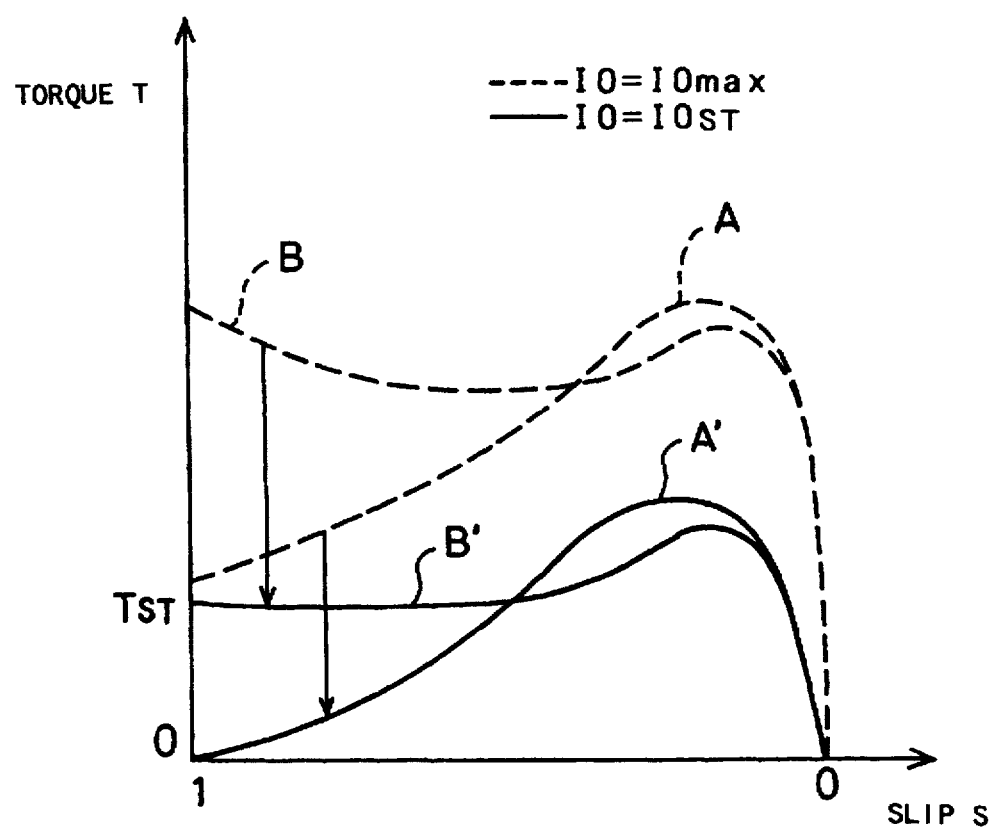
FIG. 11 is a graph showing the relationship between the current value I0 of the exciting current flown through the three-phase coils 38 and the torque-slip characteristics of the first motor MG1 and the second motor MG2.

The following describes a control procedure of the engine 50 at a starting time, based on a starting time process routine shown in the flowchart of FIG. 10. The starting time process routine is executed when the starter switch 79 is turned ON while both the vehicle and the engine 50 are at a stop. When the program enters the process routine of FIG. 10, the control CPU 90 of the controller 80 first sets a predetermined value I0ST to the electric current command value I0*, which represents the magnitude of the exciting current to be flown through the three-phase coils 38 of the stator 32, at step S130. The predetermined value I0ST is set as a value of electric current which does not generate a required torque for rotating and driving the drive shaft 22 in the second motor MG2 but generates a required torque for cranking the engine 50 in the first motor MG1, when both the first motor MG1 and the second motor MG2 in the ceasing state are controlled to carry out the power operation. This is explained in detail based on the graph of FIG. 11.

As discussed previously, the second motor MG2 is structured as an ordinary squirrel-cage induction motor, and the first motor MG1 as a special double squirrel-cage induction motor. The torque-slip characteristics of these motors MG2 and MG1 are accordingly given as curves A and B of the broken line in FIG. 11 (which are identical with the curves A and B in FIG. 4). These torque-slip characteristics are obtained under the condition of a rated electric current. When the value of the exciting current flown through the three-phase coils 38 is set smaller than the value of the rated electric current, the torque-slip characteristics curve is shifted downward in the graph. The torque-slip characteristics curve of the second motor MG2 given as the curve A of the broken line thus eventually reaches a curve A', wherein the torque is equal to zero at the slip s2 having the value '1'. The torque-characteristics curve of the first motor MG1 at this moment is given as a curve B', wherein the torque is equal to TST at the slip s1 having the value '1'. In this embodiment, the predetermined value I0ST represents a value of electric current when the torque-characteristics curves of the second motor MG2 and the first motor MG1 are respectively given as the curves A' and B'. The torque output from the first motor MG1 is accordingly equal to the value TST, which is an initial torque for cranking the engine 50.

After setting the predetermined value I0ST to the electric current command value I0* at step S130, the control CPU 90 sets a predetermined value ω0ST to the frequency command value ω0* of the exciting current flown through the three-phase coils 38 at step S132. The predetermined value ω0ST is set as a frequency of the revolving magnetic field of the stator 32 required for rotating the rotor 34 included in the first motor MG1 at a revolving speed of not lower than a predetermined value NST. The predetermined value NST will be described later. After setting the frequency command value ω0* and the electric current command value I0* of the exciting current to be flown through the three-phase coils 38 of the stator 32, the control CPU 90 PWM controls the on-time of the transistors Tr1 through Tr6 in the driving circuit 92, in order to make the preset electric current flow through the three-phase coils 38 at step S134.

The control CPU 90 then reads data of the revolving speed Ne of the engine 50 at step S136, and determines whether or not the input revolving speed Ne is equal to or higher than the predetermined value NST at step S138. The revolving speed Ne of the engine 50 may be calculated from the rotational angle θe of the engine 50 measured by the resolver 44 attached to the crankshaft 56, or alternatively input, as a signal detected by the speed sensor 76 attached to the distributor 60, directly from the EFIECU 70 through communication. The predetermined value NST is set as a value of not lower than a minimum revolving speed that enables stationary driving of the engine 50. In this embodiment, the predetermined value NST is set to be a little higher than the minimum revolving speed, in order to reduce the energy consumed by the first motor MG1 at the time of starting the engine 50. The predetermined value NST may be any revolving speed as long as it is not lower than the minimum revolving speed. The predetermined value NST may thus be a revolving speed at a driving point of the engine 50 after a start of the operation.

When the input revolving speed Ne of the engine 50 is lower than the predetermined value NST at step S138, the program returns to step S136 and receives another data of the revolving speed Ne of the engine 50. When the input revolving speed Ne of the engine 50 is not lower than the predetermined value NST at step S138, on the contrary, the program goes to step S140 to start injection of the fuel from the fuel injection valve 51 and spark ignition with the ignition plug 62, thereby starting the operation control of the engine 50. The program then exits from this routine.

As discussed above, the power output apparatus 10 of the first embodiment executes the starting time process routine and enables the first motor MG1 to start the engine 50 without rotating and driving the drive shaft 22, upon condition that the first motor MG1 and the second motor MG2 of the complex motor 30 are structured as induction motors having different torque-slip characteristics. This structure does not require any additional motor for starting the engine 50.

In the starting time process routine of the embodiment, the predetermined value I0ST is specified as a value of electric current that makes the torque equal to zero at the slip s2 having the value '1' in the torque-slip characteristics curve of the second motor MG2, and is set to the electric current command value I0*. In accordance with another possible application, however, the predetermined value I0ST may be specified as a value of electric current that makes the torque equal to or smaller than the maximum stationary friction of the drive shaft 22 at the slip s2 having the value '1', and set to the electric current command value I0*. This also prevents the torque output from the second motor MG2 from rotating and driving the drive shaft 22. In accordance with still another possible application, the predetermined value I0ST is set as a value smaller than a specific value of electric current that makes the torque equal to zero at the slip s2 having the value '1' in the torque-slip characteristics curve of the second motor MG2. The electric current smaller than the specific value of electric current makes the torque of the second motor MG2 equal to zero at the slip s2 having the value '1'. In case that a braking mechanism is disposed on the drive shaft 22, the predetermined value I0ST may be specified as a value of electric current that makes the torque equal to or greater than the maximum stationary friction of the drive shaft 22 at the slip s2 having the value '1' in the torque-slip characteristic curve of the second motor MG2, and set to the electric current command value I0*.

The starting time process routine of the embodiment starts the engine 50 while the vehicle is at a stop. The starting time process routine may, however, be applied to start the engine 50 while the vehicle is being driven. In the latter case, the torque output from the second motor MG2 depends upon the accelerator pedal position AP.

Figure 12:
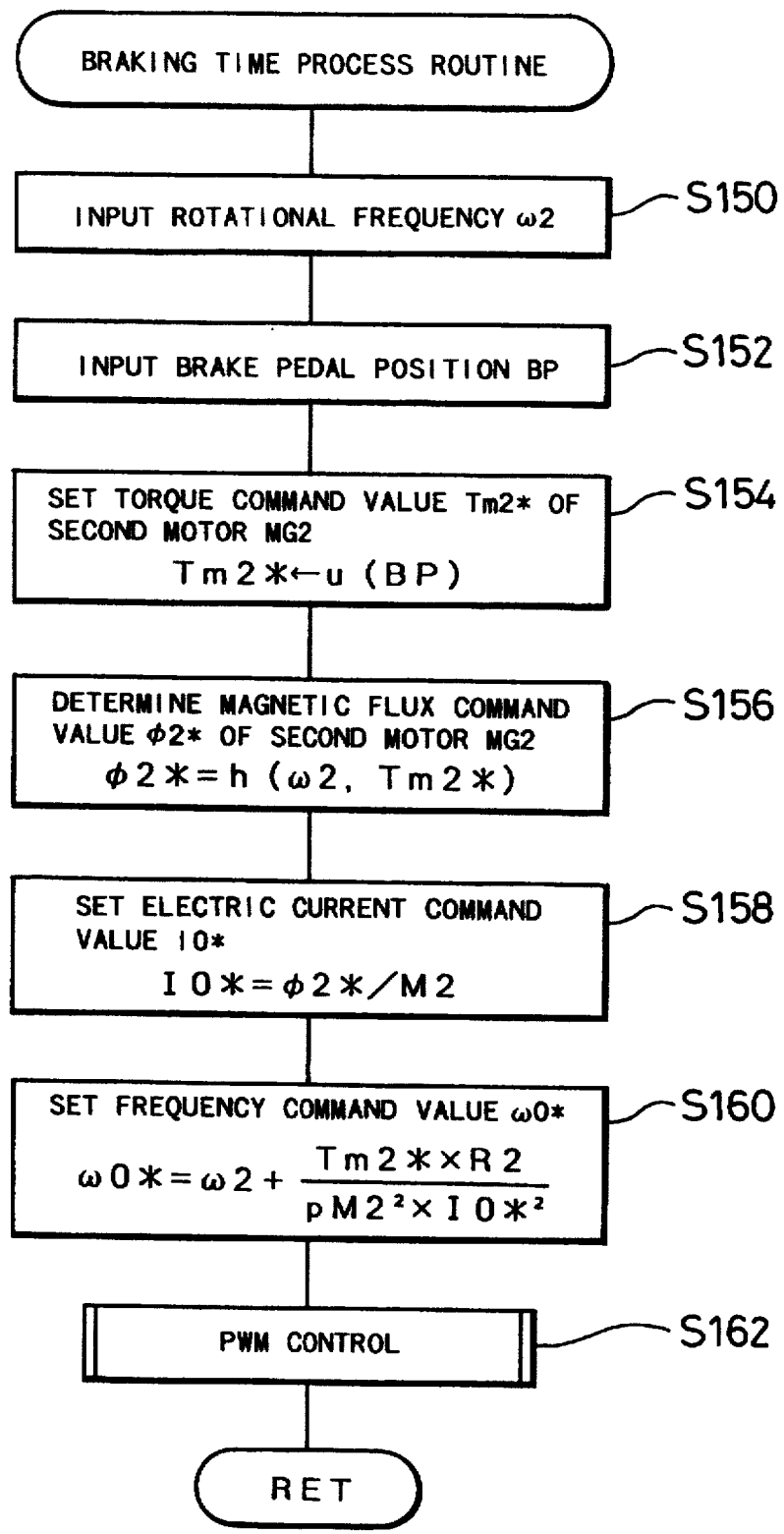
FIG. 12 is a flowchart showing a braking time process routine executed by the control CPU 90 of the controller 80.

The following describes a control procedure at a braking time, when the brake pedal 65 is stepped on, based on a braking time process routine shown in the flowchart of FIG. 12. The braking time process routine is executed when the brake pedal position sensor 65a detects a step-on of the brake pedal 65. When the program enters the process routine of FIG. 12, the control CPU 90 of the controller 80 first receives data of the rotational frequency ω2 of the second motor MG2 at step S150 and data of the brake pedal position BP measured by the brake pedal position sensor 65a at step S152. The control CPU then determines the torque command value Tm2* of the second motor MG2, based on the input brake pedal position BP at step S154. The brake pedal position BP of the brake pedal 65 reflects a desired braking force which the driver requires, so that the torque of the second motor MG2 functioning as the braking force is set based on the brake pedal position BP. In this embodiment, torque command values Tm2* as braking forces are set in advance for the respective values of the brake pedal position BP and stored as a map (not shown) in the ROM 90b. In accordance with a concrete procedure, at step S154, the torque command value Tm2* corresponding to the input brake pedal position BP is read from the map stored in the ROM 90b. The torque command value Tm2* of the second motor MG2 set at step S154 acts as a braking force of the drive shaft 22 and accordingly represents a torque applied in reverse of the rotation of the drive shaft 22. When it is assumed that the torque command value Tm2* set at step S104 in the processing routine in the stationary driving condition of FIG. 6 is positive, the torque command value Tm2* set at step S154 has a negative value.

After determining the torque command value Tm2* of the second motor MG2, the control CPU 90 carries out the processing of steps S156 through S160 that is identical with the processing of steps S112 through S116 in the processing routine in the stationary driving condition of FIG. 6. Namely the control CPU 90 calculates the magnetic flux command value $\phi 2^*$ of the second motor MG2 at step S156, sets the electric current command value I0* at step S158, and sets the frequency command value $\omega 0^*$ at step S160. The control CPU 90 subsequently carries out the PWM control in order to enable the preset electric current having the magnitude equal to the electric current command value I0* and the frequency equal to the frequency command value $\omega 0^*$ to flow through the three-phase coils 38 at step S162. In this routine, the torque command value Tm2* is negative as mentioned above, so that the second term on the right side of Equation (4) takes a negative value and the frequency command value $\omega 0^*$ calculated by Equation (4) becomes smaller than the rotational frequency $\omega 2$.

Figure 13:
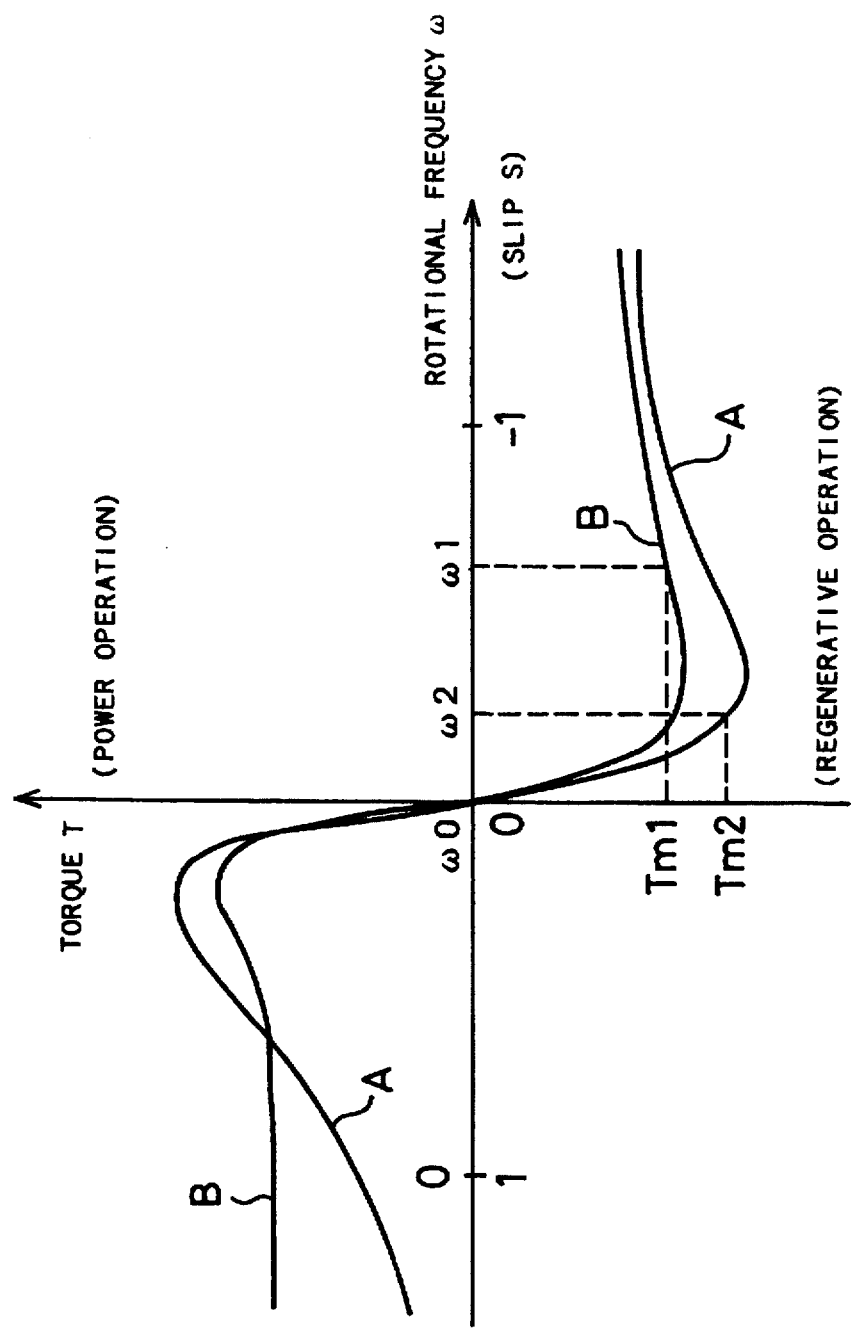
FIG. 13 shows the relationship between the rotational frequency and the torque-slip characteristics of both the motors at the time of braking.

FIG. 13 is a graph showing an exemplified relationship between the torque-slip characteristics of both the motors and the rotational frequency at the time of braking. Referring to FIG. 13, since the frequency command value $\omega 0^*$ is set to be smaller than the rotational frequency $\omega 2$, the rotational frequency $\omega 0$ of the revolving magnetic field in the stator 32 becomes smaller than the rotational frequency $\omega 2$. The second motor MG2 accordingly has a negative slip s2 and functions as a generator to regenerate the kinetic energy of the vehicle as electrical energy via the drive shaft 22 and stores the regenerative electrical energy into the battery 94 via the driving circuit 92.

As discussed previously, the power output apparatus 10 of the embodiment executes the braking time process routine and enables the second motor MG2 in the complex motor 30 to apply the braking force to the drive shaft 22. At this moment, the second motor MG2 works as a generator to regenerate the kinetic energy of the vehicle as electrical energy and stores the regenerative electrical energy into the battery 94. This structure improves the energy efficiency of the whole power output apparatus 10.

Although the braking time process routine of the embodiment neglects the control of the first motor MG1, the first motor MG1 may be controlled in the same manner as the processing of steps S118 and S120 in the processing routine in the stationary driving condition shown in the flowchart of FIG. 6. In the braking time process routine of the embodiment, the torque command value Tm2* is set based on the brake pedal position BP. In accordance with another possible application, the torque command value Tm2* may be set independently of the brake pedal position BP, for example, set to a predetermined value or set based on the value of the rotational frequency $\omega 2$.

Figure 14:
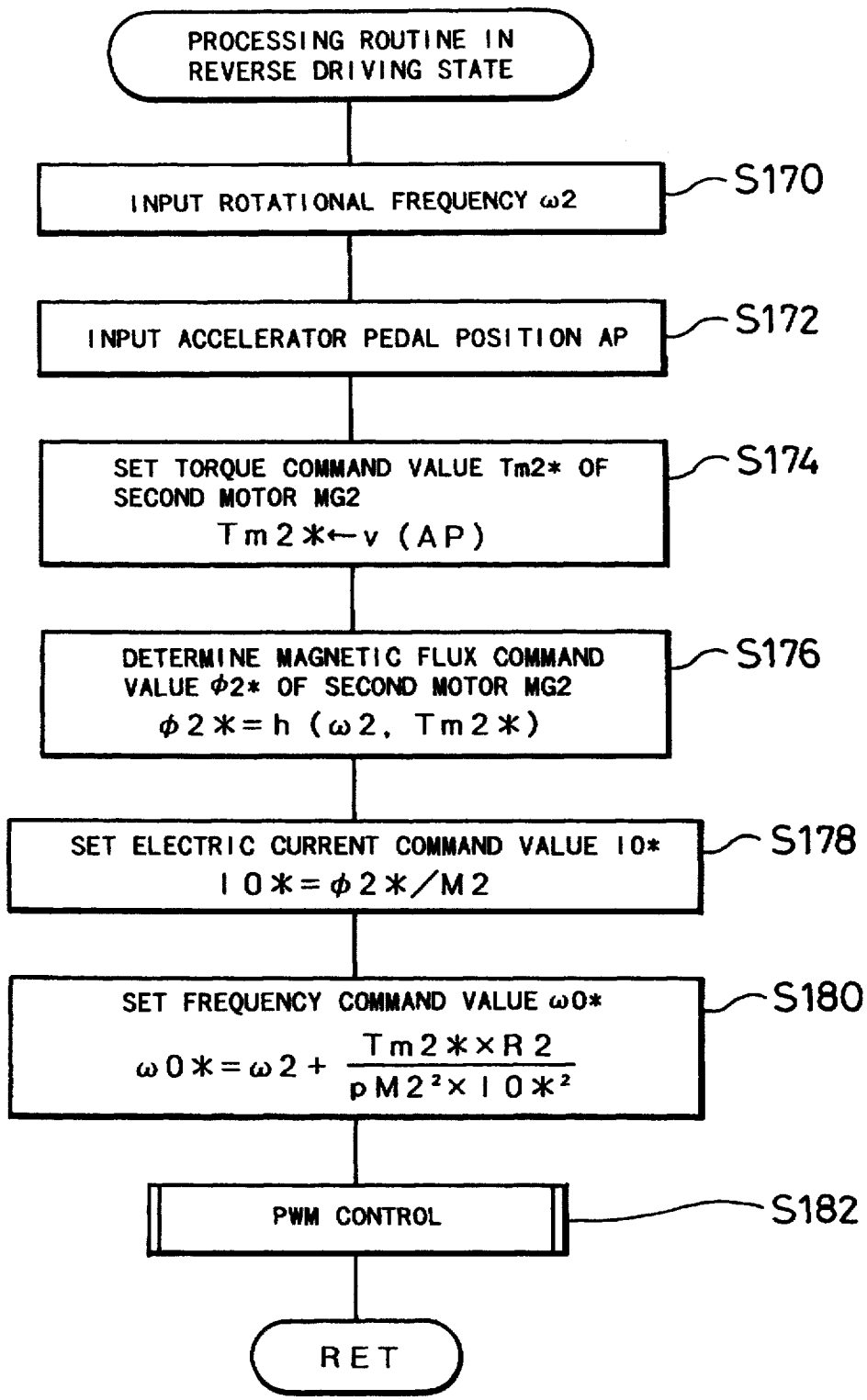
FIG. 14 is a flowchart showing a processing routine in a reverse driving state executed by the control CPU 90 of the controller 80.

The following describes a control procedure at the time of moving the vehicle back, based on a processing routine in a reverse driving state shown in the flowchart of FIG. 14. The processing routine in the reverse driving state is executed repeatedly at predetermined time intervals, for example, at every 10 msec, when the gearshift 82 is set in Reverse position and the gearshift position sensor 84 detects the Reverse position. When the program enters the routine of FIG. 14, the control CPU 90 of the controller 80 first receives data of the rotational frequency $\omega 2$ of the second motor MG2 at step S170 and the accelerator pedal position AP measured by the accelerator pedal position sensor 64a at step S172. The control CPU 90 then determines the torque command value Tm2* of the second motor MG2 based on the input accelerator pedal position AP at step S174. The torque command value Tm2* of the second motor set at step S174 is applied to rotate the drive shaft 22 in the reverse direction. When it is assumed that the torque command value Tm2* set at step S104 in the processing routine in the stationary driving condition of FIG. 6 is positive, the torque command value Tm2* set at step S174 has a negative value.

After determining the torque command value Tm2* of the second motor MG2, the control CPU 90 carries out the processing of steps S176 through S180 that is identical with the processing of steps S112 through S116 in the processing routine in the stationary driving condition of FIG. 6. Namely the control CPU 90 calculates the magnetic flux command value $\phi 2^*$ of the second motor MG2 at step S176, sets the electric current command value I0* at step S178, and sets the frequency command value $\omega 0^*$ at step S180. The control CPU 90 subsequently carries out the PWM control in order to enable the preset electric current having the magnitude equal to the electric current command value I0* and the frequency equal to the frequency command value $\omega 0^*$ to flow through the three-phase coils 38 at step S182. In this routine, the torque command value Tm2* is negative as mentioned above, so that the frequency command value $\omega 0^*$ calculated by Equation (4) becomes smaller than the rotational frequency $\omega 2$. When it is assumed that the rotational frequency $\omega 2$ in the forward driving state has a positive value, the rotational frequency $\omega 2$ in the reverse driving state has a negative value. The frequency command value $\omega 0^*$ is smaller than the rotational frequency $\omega 2$ and thus takes a negative value. The procedure of making the electric current having a negative frequency flown through the three-phase coils 38 implies the procedure of making the electric current having a positive frequency flown through the three-phase coils 38 in a reversed phase sequence. Namely when the electric current is flown through the three-phase coils 38 in the forward driving state in the sequence of u, v, and w phases, the same electric current is flown through the three-phase coils 38 in the reverse driving state in the reversed sequence of w, v, and u phases. The PWM control carried out at step S182 accordingly enables the electric current having a positive frequency command value $\omega 0^*$ to flow through the three-phase coils 38 in a reversed phase sequence.

Figure 15:
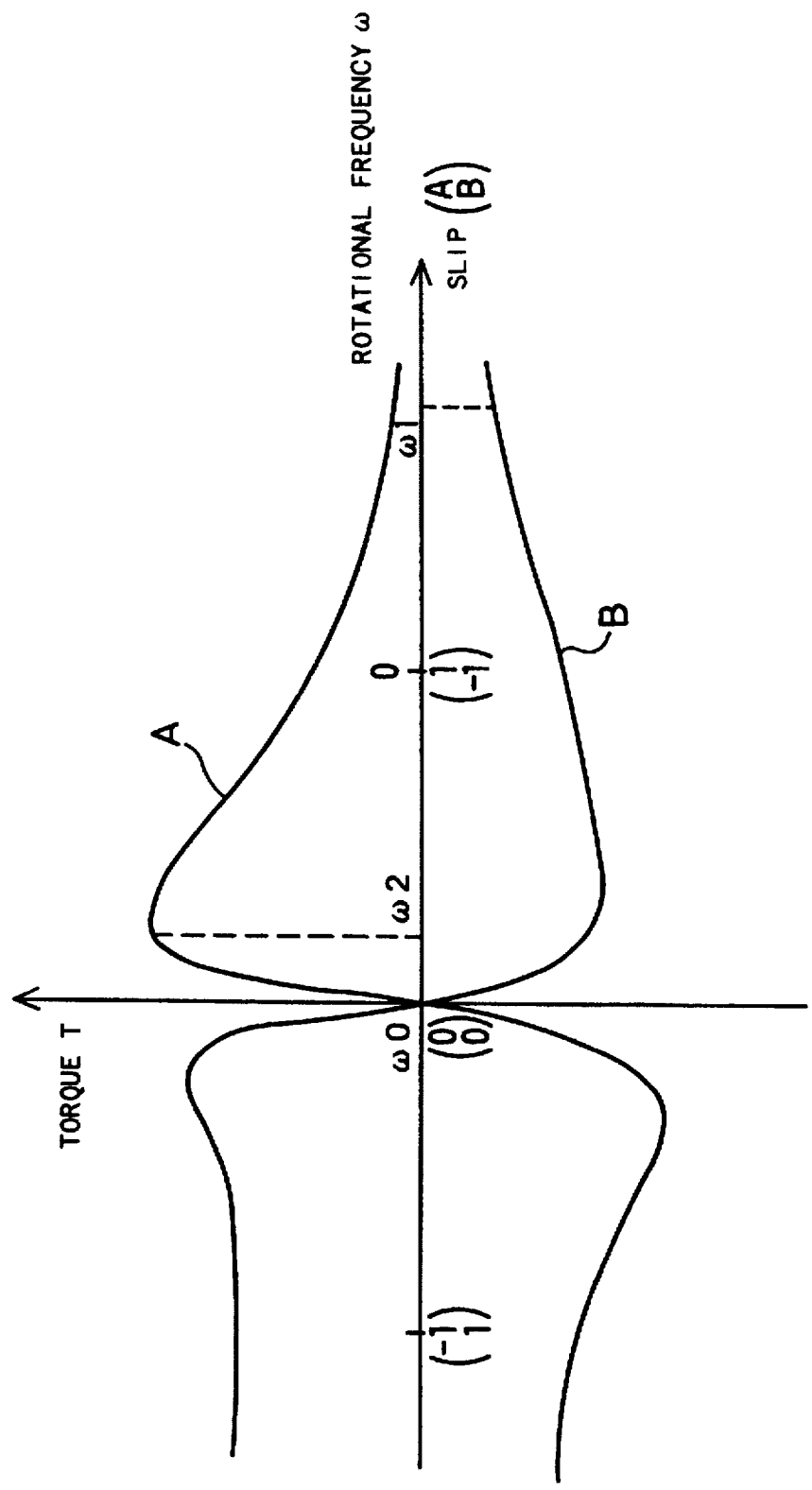
FIG. 15 shows the relationship between the rotational frequency and the torque-slip characteristics of both the motors in the reverse driving state.

FIG. 15 is a graph showing an exemplified relationship between the torque-slip characteristics of both the motors and the rotational frequency at the time of moving the vehicle back. When it is assumed that the torque-slip characteristics of the second motor MG2 are identical irrespective of the direction of rotation, the torque-slip characteristics curve in the reverse driving state and the curve B shown in FIG. 5 are symmetrical with respect to the ordinate representing the torque. At this moment, the positive and negative on the abscissa representing the slip is exchanged. In the graph of FIG. 15, the scale on the abscissa increases rightward (the upper row) for the curve A representing the torque-slip characteristics of the second motor MG2, and increases leftward (the lower row) for the curve B representing the torque-slip characteristics of the first motor MG1. The slip of the second motor MG2 is accordingly regulated in the range of 0 to 1.

As discussed above, the power output apparatus 10 of the first embodiment executes the processing routine in the reverse driving state and makes the exciting current flown through the three-phase coils 38 in a reversed phase sequence, thereby moving the vehicle back. Since the second motor MG2 is structured as an induction motor, the slip of the second motor MG2 is regulated in the range of 0 to 1, so as to enable the torque to be output in the reverse driving state, in the same manner as in the forward driving state.

Although the processing routine in the reverse driving state of the embodiment neglects the control of the first motor MG1, the first motor MG1 may be controlled in the same manner as the processing of steps S118 and S120 in the processing routine in the stationary driving condition shown in the flowchart of FIG. 6. In the processing routine in the reverse driving state of the embodiment, a negative value is set to the torque command value Tm2* of the second motor MG2. Another possible procedure sets a positive value to the torque command value Tm2* of the second motor MG2 in the same manner as the processing of step S104 in the processing routine in the stationary driving condition of FIG. 6, and specifies the electric current command value I0* and the frequency command value ω0* as positive values using the absolute value of the rotational frequency ω2. The PWM control carried out at step S182 then makes the exciting current flown through the three-phase coils 38 in a reversed phase sequence using the positive electric current command value I0* and frequency command value ω0*.

The power output apparatus 10 of the first embodiment discussed above drives the vehicle by means of the engine 50, the complex motor 30, and the controller 80. The two motors MG1 and MG2 can substantially be controlled by one driving circuit. This structure further enhances the energy efficiency of the whole power output apparatus 10 and desirably reduces the size of the power output apparatus 10.

In the power output apparatus 10 of the embodiment, the first motor MG1 and the second motor MG2 are respectively structured as a special double squirrel-cage induction motor and an ordinary squirrel-cage induction motor. The engine 50 can be started as long as the torque at the slip equal to 1 in the torque-slip characteristics of the first motor MG1 is greater than the torque of the second motor MG2. Double squirrel-cage, high-resistance squirrel-cage, and deep channel-type induction motors may also be applicable to the first motor MG1. In a structure having a separate starting apparatus for the engine 50, there is no need of making the torque at the slip equal to 1 in the torque-slip characteristics of the first motor MG1 greater than the torque of the second motor MG2. Under such a condition, a variety of induction motors can be used as the first motor MG1 and the second motor MG2. Although both the first motor MG1 and the second motor MG2 are constructed as induction motors in the power output apparatus 10 of the embodiment, either one of them may be structured as a synchronous motor. In the latter case, the frequency of the synchronous motor is set to the frequency command value ω0*.

Figure 16:
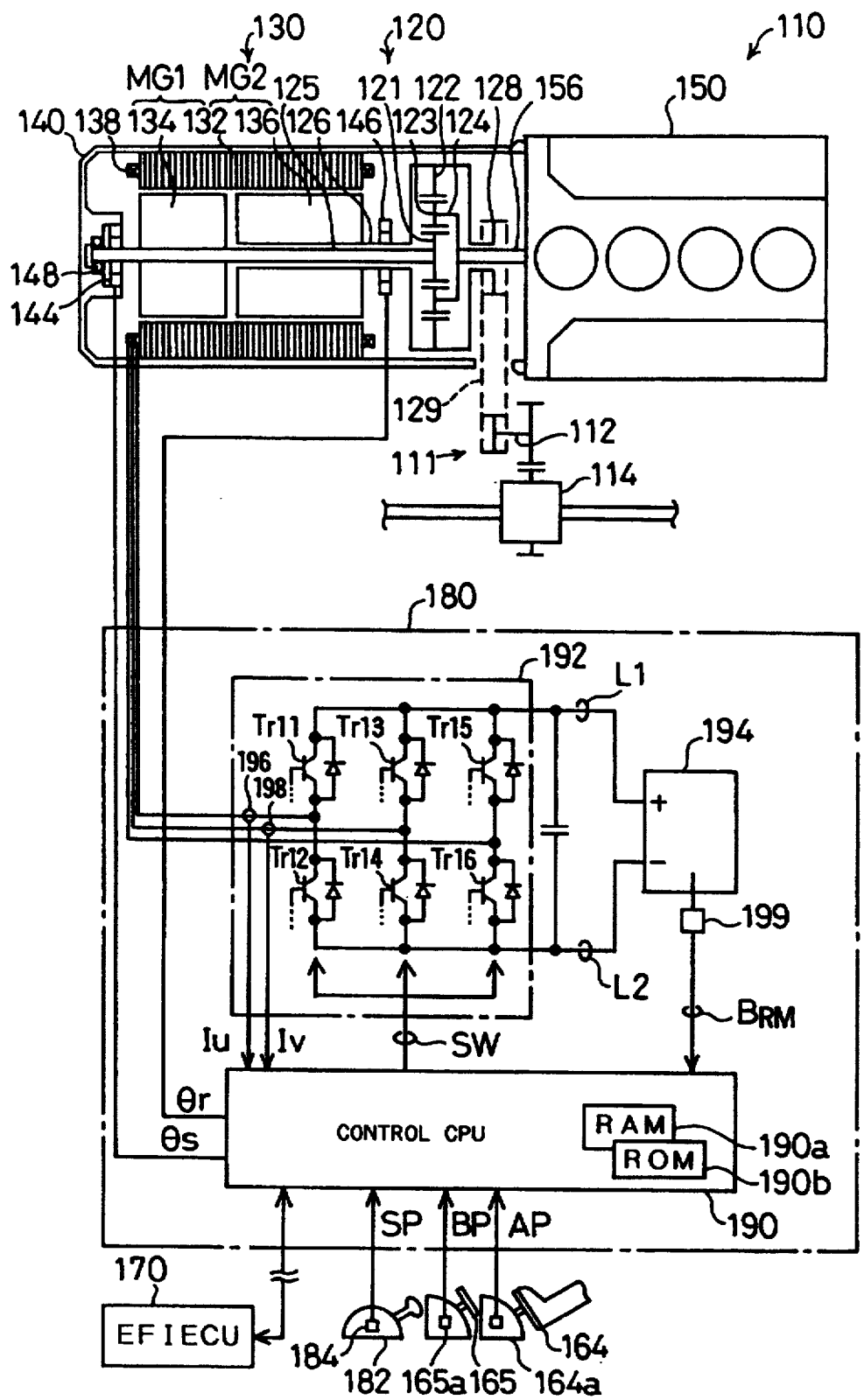
FIG. 16 schematically illustrates structure of another power output apparatus 110 as a second embodiment according to the present invention.

The following describes another power output apparatus 110 as a second embodiment according to the present invention. FIG. 16 schematically illustrates structure of the power output apparatus 110 of the second embodiment; and FIG. 17 shows a general structure of a vehicle with the power output apparatus 110 of FIG. 16 incorporated therein.

Figure 17:
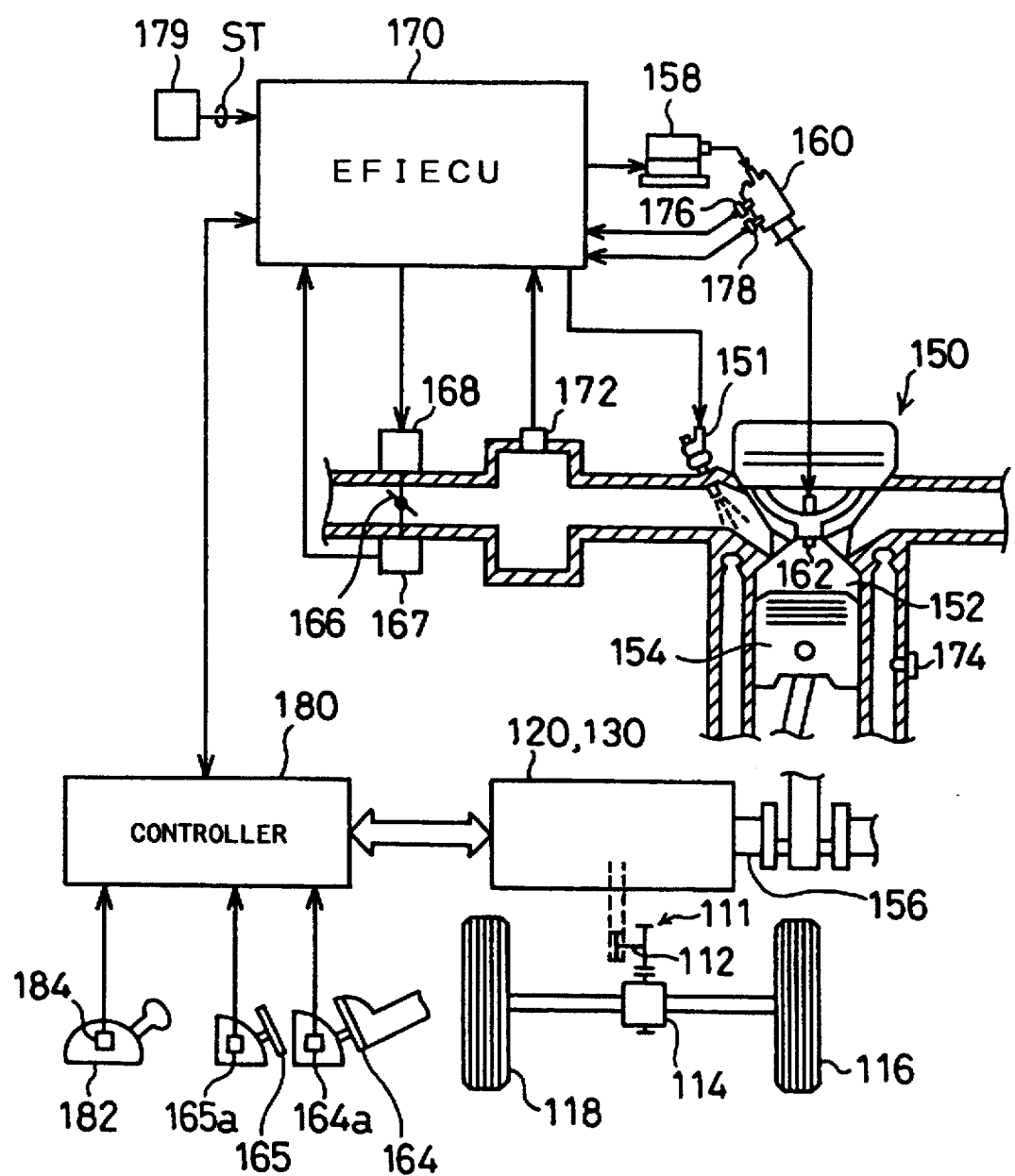
FIG. 17 schematically illustrates a general structure of a vehicle having the power output apparatus 110 of the second embodiment incorporated therein.

The vehicle of FIG. 17 with the power output apparatus 110 of the second embodiment incorporated therein has a similar structure to that of the vehicle of FIG. 2 with the power output apparatus 10 of the first embodiment incorporated therein, except that a complex motor 130 is attached to a crankshaft 156 via a planetary gear 120 in the second embodiment while the complex motor 30 is directly attached to the crankshaft 56 in the first embodiment. The same constituents are expressed by like numerals +100 and not specifically described here. The numerals and symbols used in the description of the power output apparatus 10 of the first embodiment have the same meanings in the description of the power output apparatus 110 of the second embodiment, unless otherwise specified.

Referring to FIG. 16, the power output apparatus 110 primarily includes an engine 150, a planetary gear 120 having a planetary carrier 124 mechanically linked with a crankshaft 156 of the engine 150, a complex motor 130 having a rotor 134 linked with a sun gear 121 of the planetary gear 120 and a rotor 136 and a stator 132 linked with a ring gear 122 of the planetary gear 120, and a controller 180 for driving and controlling the complex motor 130.

The planetary gear 120 includes the sun gear 121 linked with a sun gear shaft 125 that is coaxial with the crankshaft 156, the ring gear 122 linked with a hollow ring gear shaft 126 that is coaxial with the sun gear shaft 125, a plurality of planetary pinion gears 123 arranged between the sun gear 121 and the ring gear 122 to revolve around the sun gear 121 while rotating on its axis, and the planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the powers input to and output from any two shafts among the three shafts automatically determines the powers input to and output from the residual one shaft. The details of the input and output process of the powers into and from the three shafts of the planetary gear 120 will be discussed later.

A power feed gear 128 for taking out the power is linked with the ring gear 122 and arranged on the side of the engine 150. The power feed gear 128 is further connected to a power transmission gear 111 via a chain belt 129, so that the power is transmitted between the power feed gear 128 and the power transmission gear 111. As shown in FIG. 17, the power transmission gear 111 is further linked with a differential gear 114. The power output from the power output apparatus 110 is thus eventually transmitted to left and right driving wheels 116 and 118.

The complex motor 130 has the structure similar to that of the complex motor 30 included in the power output apparatus 10 of the first embodiment. The rotor 134 linked with the sun gear shaft 125 and the stator 132 constitute a first motor MG1, whereas the rotor 136 linked with the ring gear shaft 126 and the stator 132 constitute a second motor MG2. A resolver 134 for measuring a rotational angle θs of the sun gear shaft 125 is mounted on the sun gear shaft 125, and a resolver 136 for measuring a rotational angle θr of the ring gear shaft 126 is mounted on the ring gear shaft 126.

The controller 180 included in the power output apparatus 110 of the second embodiment has the similar structure to that of the controller 80 included in the power output apparatus 10 of the first embodiment. Namely the controller 180 includes a driving circuit 192 for regulating the exciting current to be flown through three-phase coils 138 of the stator 132 in the complex motor 130, a control CPU 190 for controlling the driving circuit 192, and a battery 194 including a number of secondary cells. The control CPU 190 is a one-chip microprocessor including a RAM 190a used as a working memory, a ROM 190b in which a variety of processing programs are stored, an input/output port (not shown), and a serial communication port (not shown) through which data are sent to and received from an EFIECU 170. The control CPU 190 receives a variety of data via the input port. The input data include the rotational angle θs of the sun gear shaft 125 measured with the resolver 134, the rotational angle θr of the ring gear shaft 126 measured with the resolver 136, an accelerator pedal position AP (step-on amount of an accelerator pedal 164) output from an accelerator pedal position sensor 164a, a brake pedal position BP (step-on amount of a brake pedal 165) output from a brake pedal position sensor 165a, a gearshift position SP output from a gearshift position sensor 184, phase currents Iu and Iv measured with two ammeters 196 and 198 disposed in the driving circuit 192, and a remaining charge BRM of the battery 194 measured with a remaining charge meter 199.

The control CPU 190 outputs a control signal SW for driving six transistors Tr11 through Tr16 working as switching elements in the driving circuit 192. The six transistors Tr11 through Tr16 in the driving circuit 192 constitute a transistor inverter and are arranged in pairs to work as a source and a drain with respect to a pair of power lines L1 and L2. Each phase coil of the three-phase coils 138 in the complex motor 130 is connected to each contact of the paired transistors. The power lines L1 and L2 are respectively connected to plus and minus terminals of the battery 194. The control signal SW output from the control CPU 190 thus successively controls the power-on time of the paired transistors Tr11 through Tr16. The electric current flowing through each phase coil of the three-phase coils 138 is PWM (pulse width modulation) controlled to give a quasi-sine wave, which enables the three-phase coils 138 to form a revolving magnetic field.

The power output apparatus 110 of the second embodiment thus constructed follows the operation principle discussed below. By way of example, it is assumed that the engine 150 is driven at a driving point defined by a revolving speed Ne and a torque Te and that the ring gear shaft 126 is rotated at a driving point defined by a revolving speed Nr and a torque Tr. According to the mechanics, the relationship between the revolving speed and the torque of the three shafts in the planetary gear 120 (that is, the sun gear shaft 125, the ring gear shaft 126, and the planetary carrier 124) can be expressed as a nomogram illustrated in FIG. 18 and solved geometrically. The relationship between the revolving speed and the torque of the three shafts in the planetary gear 120 may be analyzed numerically through calculation of energies of the respective shafts, without using the nomogram. For the clarity of explanation, however, the nomogram is used in the second embodiment.

Figure 18:
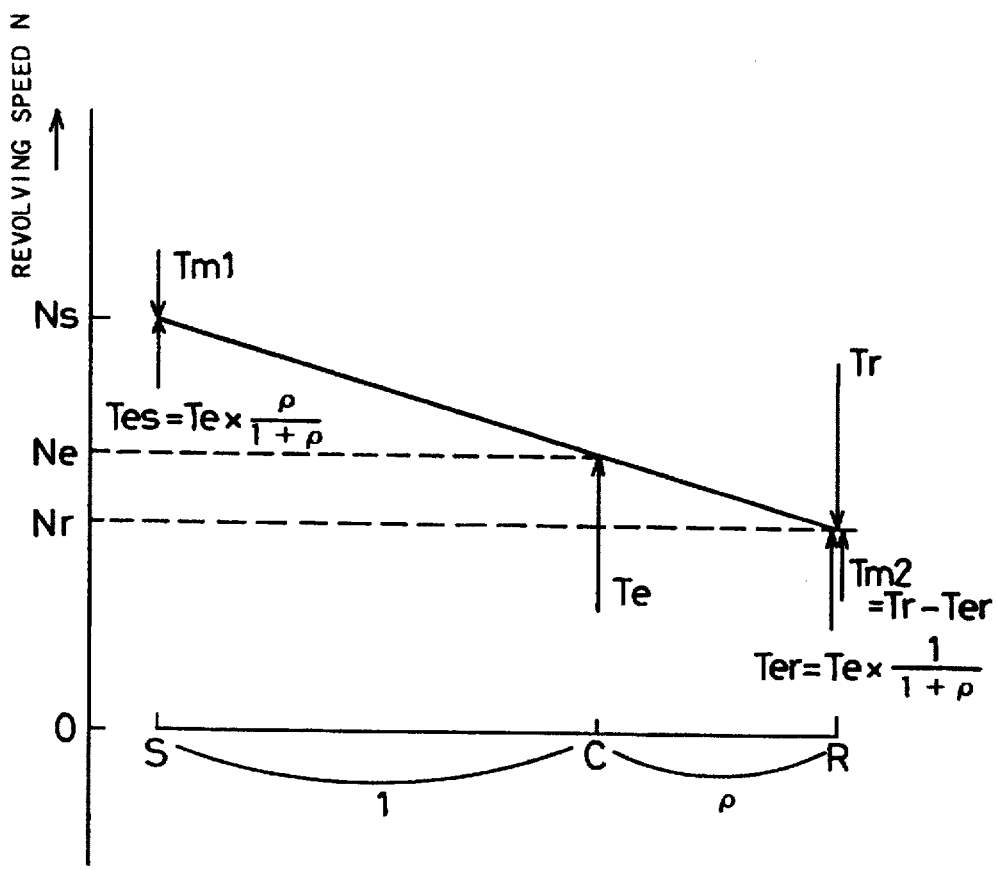
FIG. 18 is a nomogram showing the relationship between the revolving speed and the torques of the three shafts connected to the planetary gear 120.

In the nomogram of FIG. 18, the revolving speeds of the three shafts are plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the planetary carrier 124 is given as an interior division of the axes S and R at the ratio of 1 to ρ, wherein ρ represents a ratio of the number of teeth of the ring gear 122 to that of the sun gear 121 and expressed as Equation (14) given below:

$$P = \frac{\text{The Number Of Teeth Of The Sun Gear}}{\text{The Number Of Teeth Of The Ring Gear}} \quad (14)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the planetary carrier 124 linked with the crankshaft 156 of the engine 150, and the revolving speed Nr of the ring gear shaft 126 on the coordinate axis R of the ring gear shaft 126. A straight line passing through both the points is drawn, and a revolving speed NS of the sun gear shaft 125 is then given as the intersection of this straight line and the coordinate axis S. This straight line is hereinafter referred to as dynamic collinear line. The revolving speed Ns of the sun gear shaft 125 can be calculated from the revolving speed Ne of the engine 150 and the revolving speed Nr of the ring gear shaft 126 according to a proportional expression given as Equation (15) below. In the planetary gear 120, the determination of the rotations of any two shafts among the sun gear 121, the ring gear 122, and the planetary carrier 124 results in automatically setting the rotation of the residual one shaft.

$$Ns = Nr - (Nr - Nc)\frac{1+\rho}{\rho} \quad (15)$$

The torque Te of the engine 150 is then applied (upward in the drawing) to the dynamic collinear line at the coordinate axis C of the planetary carrier 124 as a line of action. The dynamic collinear line against the torque can be handled as a rigid body to which a force is applied as a vector. Based on the technique of dividing the force into different lines of action having the same direction, the torque Te acting on the coordinate axis C is divided into a torque Tes on the coordinate axis S and a torque Ter on the coordinate axis R. The magnitudes of the torques Tes and Ter are given by Equations (16) and (17) below:

$$Tes = Te \times \frac{\rho}{1+\rho} \quad (16)$$

$$Ter = Te \times \frac{1}{1+\rho} \quad (17)$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1 in the complex motor 130, and the torque Tm2 by the second motor MG2 in the complex motor 130. The first motor MG1 applies the torque Tm1 in reverse of its rotation and thereby works as a generator, while the second motor MG2 applies the torque Tm2 in the direction of its rotation and thereby works as a motor. In order to drive the first motor MG1 as a generator and the second motor MG2 as a motor in the complex motor 130, a rotational frequency ω0 of a revolving magnetic field in the stator 132 of the complex motor 130 should be set smaller than a rotational frequency ω1 of the rotor 134 in the first motor MG1 and greater than a rotational frequency ω2 of the rotor 136 in the second motor MG2; that is, the rotational frequency ω0 should satisfy the relationship of ω1>ω0>ω2. In the nomogram of FIG. 18, the revolving speed Ns of the sun gear shaft 125 linked with the rotor 134 of the first motor MG1 is higher than the revolving speed Nr of the ring gear shaft 126 linked with the rotor 136 of the second motor MG2, so that the relationship of ω1>ω2 is held. Regulation of the rotational frequency ω0 in the range of ω1>ω0>ω2 by the driving circuit 192 enables the first motor MG1 and the second motor MG2 in the complex motor 130 to function respectively as a generator and as a motor, thereby outputting the power to the ring gear shaft 126.

In the power output apparatus 110 of the second embodiment, the power output to the ring gear shaft 126 is transmitted to a drive shaft 112 via the power feed gear 128 and the power transmission gear 111, and further transmitted to the driving wheels 116 and 118 via the differential gear 114 as discussed previously. A linear relationship is accordingly held between the power output to the ring gear shaft 126 and the power transmitted to the driving wheels 116 and 118. The power transmitted to the driving wheels 116 and 118 can thus be controlled by regulating the power output to the ring gear shaft 126.

Figure 19:
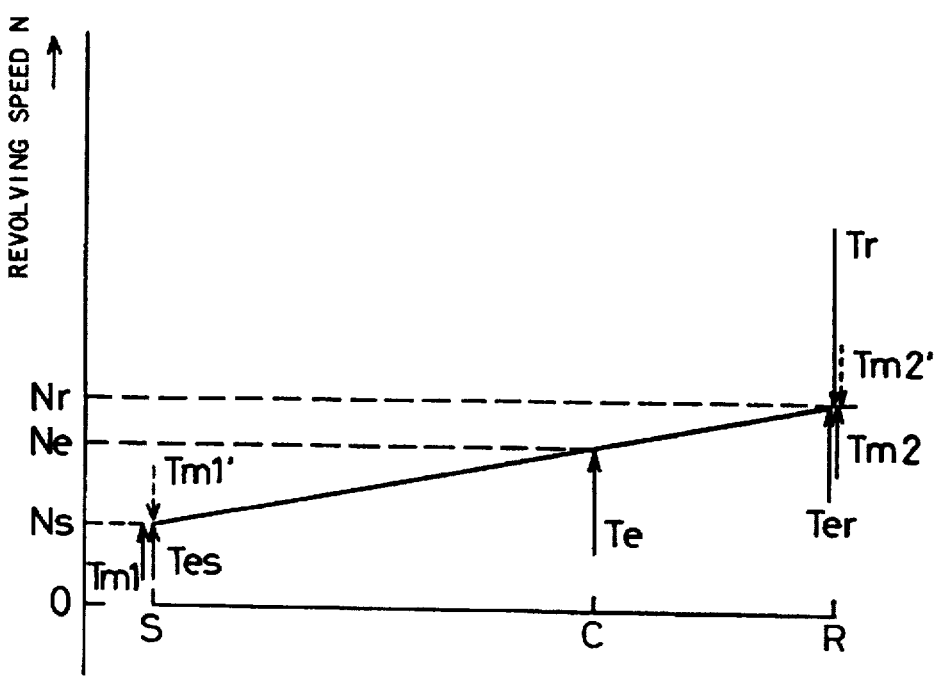
FIG. 19 is a nomogram showing the relationship between the revolving speed and the torques of the three shafts connected to the planetary gear 120.

In the nomogram of FIG. 18, the revolving speed Ns of the sung gear shaft 125 is higher than the revolving speed Nr of the ring gear shaft 126. For some combinations of the revolving speed Ne of the engine 150 with the revolving speed Nr of the ring gear shaft 126, however, the revolving speed Ns becomes lower than the revolving speed Nr as shown in the nomogram of FIG. 19. In this case, the rotational frequency ω1 becomes smaller than the rotational frequency ω2 (ω1<ω2), so that the relationship of ω1>ω0>ω2 can not be satisfied. Namely it is impossible to drive the first motor MG1 as a generator and the second motor MG2 as a motor in the complex motor 130. When the exciting current flown through the three-phase coils 138 of the stator 132 is regulated to satisfy the relationship of ω0>ω1>ω2 in this state, both the first motor MG1 and the second motor MG2 in the complex motor 130 function as motors. The first motor MG1 and the second motor MG2 respectively output torques Tm1 and Tm2 shown by the solid arrows in FIG. 19. The forces are not balanced on the dynamic collinear line since there is no reaction force on the coordinate axis S, and the revolving speed Ns of the sun gear shaft 125 accordingly increases. The revolving speed Ns of the sun gear shaft 125 increases to a specific level that satisfies the relationship of ω1>ω0>ω2 and realizes the equilibrium of forces on the dynamic collinear line as shown in the nomogram of FIG. 18, and is kept stationarily at the specific level. Regulation of the rotational frequency ω0 to enable the power operation of the second motor MG2 in the state of the nomogram of FIG. 19 shifts the revolving speed-torque relationship to the state of the nomogram of FIG. 18 and keeps that state stationarily.

When the exciting current flown through the three-phase coils 138 of the stator 132 is regulated to satisfy the relationship of ω1>ω2>ω0 in the state of the nomogram shown in FIG. 19, on the other hand, both the first motor MG1 and the second motor MG2 in the complex motor 130 function as generators. The first motor MG1 and the second motor MG2 respectively output torques Tm1' and Tm2' shown by the broken arrows in FIG. 19. The equilibrium of forces on the dynamic collinear line is attained when the magnitudes of the torques satisfy Tm1'=Tes and Tm2'=Ter-Tr. The revolving speed-torque relationship is accordingly shifted to this state and is kept stationarily.

The above discussion on the fundamental operation principle shows that the power output apparatus 110 of the second embodiment is operable in the state of the nomogram of FIG. 18. In this state, the first motor MG1 and the second motor MG2 in the complex motor 130 respectively work as a generator and a motor, and the rotational frequency ω1 of the rotor 134 in the first motor MG1 and the rotational frequency ω2 of the rotor 136 in the second motor MG2 satisfy the relationship of ω1>ω2. The operation of the complex motor 130 is accordingly similar to that of the complex motor 30 in the power output apparatus 10 of the first embodiment in the stationary driving condition. By taking into account the equilibrium of forces on the dynamic collinear line, the control procedure of the complex motor 30 used in the power output apparatus 10 of the first embodiment is applicable to the control of the complex motor 130 in the power output apparatus 110 of the second embodiment. In the structure of the second embodiment, a torque command value Tm1* of the first motor MG1 and a torque command value Tm2* of the second motor MG2 are respectively set according to Equations (18) and (19) given below. Tr* in Equation (19) represents a torque command value to be output to the ring gear shaft 126, which is specified based on the accelerator pedal position AP measured by the accelerator pedal position sensor 164a, and corresponds to the torque command value Tm2* to be output to the drive shaft 22 in the structure of the first embodiment.

$$Tm1^* \leftarrow Te^* \times \frac{\rho}{1+\rho} \tag{18}$$

$$Tm2^* \leftarrow Tr^* - Te^* \times \frac{1}{1+\rho} \tag{19}$$

As discussed previously, in the power output apparatus 110 of the second embodiment, regulation of the rotational frequency ω0 of the revolving magnetic field generated in the stator 132 by means of the driving circuit 192 enables a desired power to be output to the drive shaft 22. Especially when the rotational frequency ω0 is regulated to satisfy the relationship of ω1>ω0>ω2, the first motor MG1 and the second motor MG2 in the complex motor 130 respectively function as a generator and a motor. In this state, the electromagnetic energy P1 regenerated by the first motor MG1 is supplied directly to the second motor MG2 via the stator 132. Compared with the structure that supplies the energy to the motor via two driving circuits, such as inverters, the structure of this embodiment enhances the energy efficiency. The structure of the second embodiment uses only one driving circuit to control both the first motor MG1 and the second motor Mg2, thereby decreasing the required number of parts and reducing the size of the whole power output apparatus 110.

Figure 20:
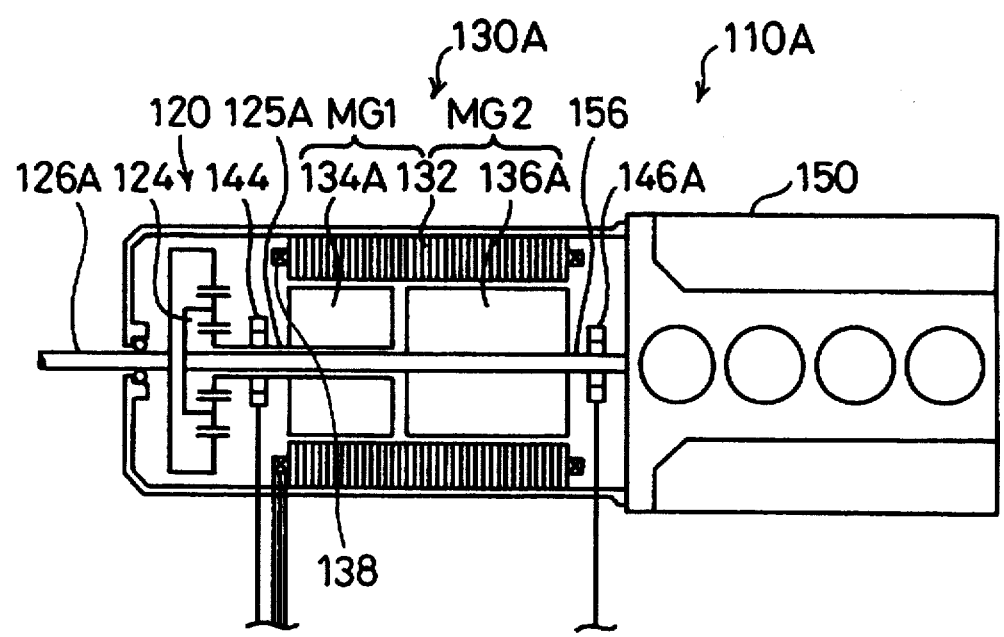
FIG. 20 schematically illustrates structure of a power output apparatus 110A given as a modified example of the second embodiment.
Figure 21:
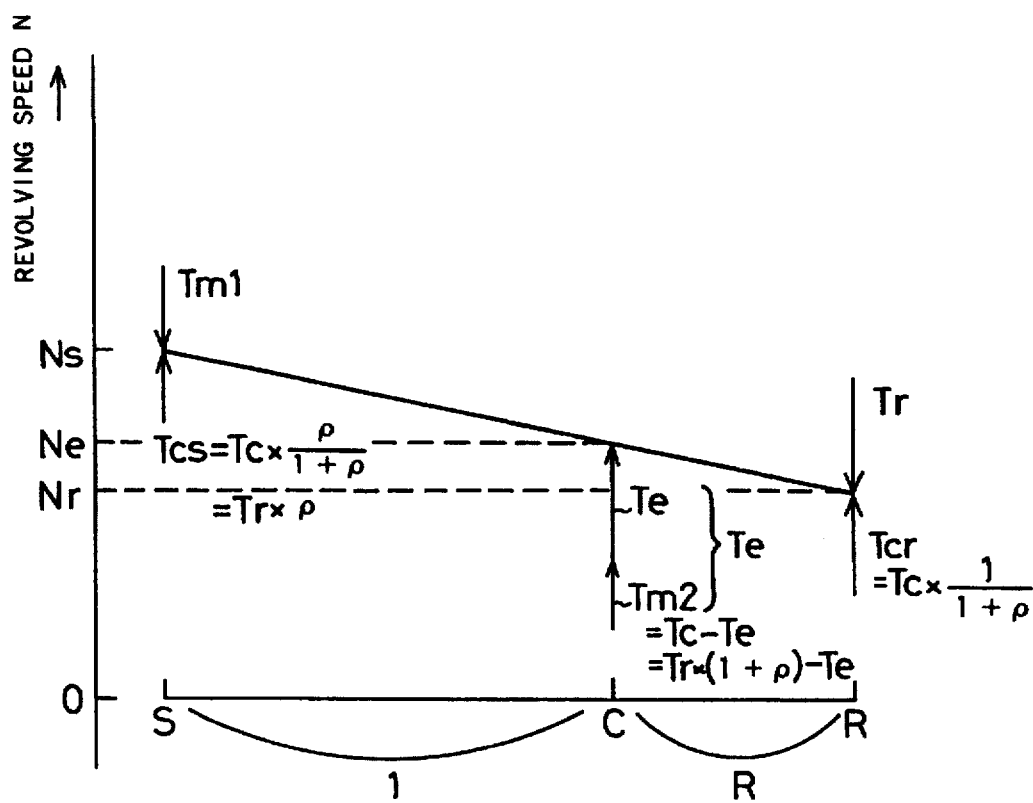
FIG. 21 is a nomogram showing the relationship between the revolving speeds and the torques of the three shafts connected to the planetary gear 120 in the power output apparatus 110A given as the modified example of the second embodiment.

In the power output apparatus 110 of the second embodiment, the rotor 136 of the second motor MG2 is attached to the ring gear shaft 126. Like another power output apparatus 110A of modified structure shown in FIG. 20, a rotor 136A of a second motor MG2 included in a complex motor 130A may be attached to the crankshaft 156. FIG. 21 is a nomogram in this modified structure. The operation principle in this structure is described briefly.

Equations (20) through (22) given below are obtained by taking into account the equilibrium of forces on the dynamic collinear line in the nomogram of FIG. 21. Equation (20) gives a total energy input into the planetary carrier 124 via the crankshaft 156, and Equations (21) and (22) are led by dividing the torque applied to the planetary carrier 124 to torques acting on coordinate axes S and R.

$$Tc = Te + Tm2 \tag{20}$$

$$Tcs = Tc \times \frac{\rho}{1+\rho} \quad (21)$$

$$Tcr = Tc \times \frac{1}{1+\rho} \quad (22)$$

The equilibrium of forces on the dynamic collinear line is essential for the stable state of the dynamic collinear line. For that purpose, it is required to make the torque Tm1 equal to a torque Tcs and the torque Tr to a torque Tcr. The torques Tm1 and Tm2 are accordingly defined as Equations (23) and (24) given below:

$$Tm1 = Tr \times \rho \quad (23)$$

$$Tm2 = Tr \times (1+\rho) - Te \quad (24)$$

While the engine 150 is driven at a driving point defined by the torque Te and the revolving speed Ne, the first motor MG1 is controlled to apply the torque Tm1 expressed as Equation (23) to a sun gear shaft 125A and the second motor MG2 is controlled to apply the torque Tm2 expressed as Equation (24) to the crankshaft 156. This enables the torque Tr to be output to a ring gear shaft 126A. Like the motors MG1 and MG2 in the complex motor 130 of the second embodiment, the first motor MG1 and the second motor MG2 in the complex motor 130A of the modified structure respectively function as a generator and a motor. The revolving speed Ns of the sun gear shaft 125A linked with a rotor 134A of the first motor MG1 is higher than the revolving speed Ne of the crankshaft 156 linked with the rotor 136A of the second motor MG2, so that the relationship of $\omega 1 > \omega 2$ is satisfied. As discussed in the second embodiment, regulation of the rotational frequency $\omega 0$ in the range of $\omega 1 > \omega 0 > \omega 2$ by means of the driving circuit 192 enables the first motor MG1 and the second motor MG2 in the complex motor 130A to function respectively as a generator and a motor, thereby allowing the power to be output to the ring gear shaft 126A.

Figure 22:
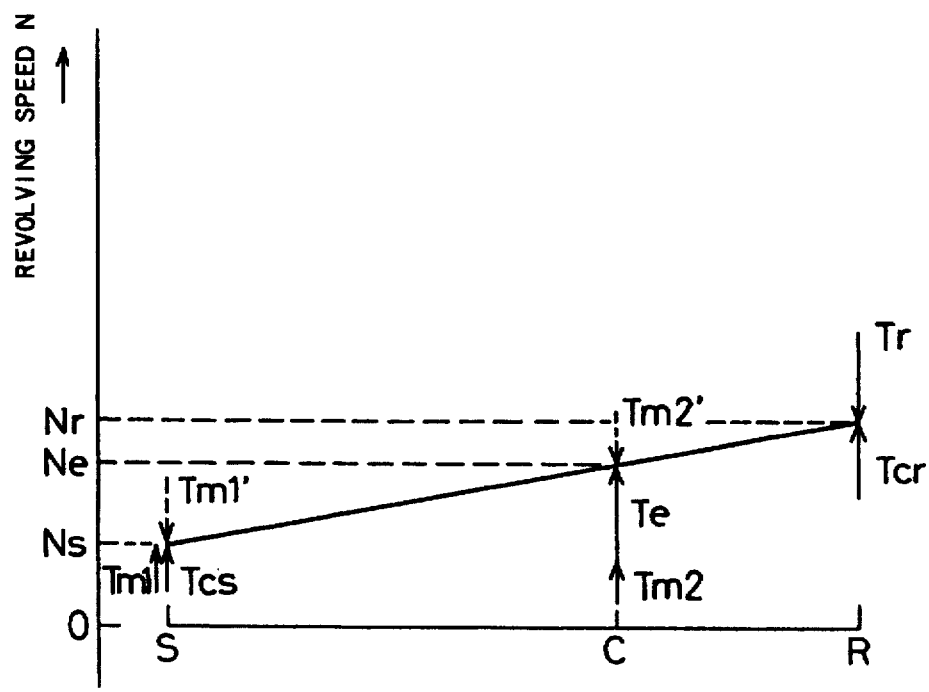
FIG. 22 is a nomogram showing the relationship between the revolving speeds and the torques of the three shafts connected to the planetary gear 120 in the power output apparatus 110A given as the modified example of the second embodiment.

In the nomogram of FIG. 21, the revolving speed Ns of the sung gear shaft 125A is higher than the revolving speed Ne of the crankshaft 156. For some combinations of the revolving speed Ne of the engine 150 with the revolving speed Nr of the ring gear shaft 126A, however, the revolving speed Ns becomes lower than the revolving speed Ne as shown in the nomogram of FIG. 22. It is considered that this state is similar to the state in the nomogram of FIG. 19. Regulation of the exciting current flown through the three-phase coils 138 of the stator 132 to satisfy the relationship of $\omega 0 > \omega 1 > \omega 2$ accordingly does not lead to the equilibrium of forces on the dynamic collinear line. This increases the revolving speed Ns of the sun gear shaft 125A, so as to satisfy the relationship of $\omega 1 > \omega 0 > \omega 2$ as shown in the nomogram of FIG. 21 and keep the stationary state at a revolving speed that attains the equilibrium of forces on the dynamic collinear line. Regulation of the exciting current flown through the three-phase coils 138 of the stator 132 to satisfy the relationship of $\omega 1 > \omega 2 > \omega 0$ enables both the first motor MG1 and the second motor MG2 in the complex motor 130A to function as generators. The equilibrium of forces on the dynamic collinear line is attained in a specific state that the magnitudes of the torques satisfy the relations of $Tm1'=Tcs$ and $Tm2'=Te-Tr(1+\rho)$. The revolving speed-torque relationship is shifted to this specific state and kept stationarily. The control procedure of the complex motor 30 used in the power output apparatus 10 of the first embodiment is applicable to the control of the complex motor 130A in this modified structure by setting the torque command value Tm1* of the first motor MG1 according to Equation (23) and the torque command value Tm2* of the second motor MG2 according to Equation (24) as discussed previously.

In the power output apparatus 110 of the second embodiment and the power output apparatus 110A given as its modified example, both the first motor MG1 and the second motor MG2 in the complex motor 130 (130A) are constructed as induction motors. Either one of them may, however, be structured as a synchronous motor. In the latter case, the frequency of the synchronous motor is set to the frequency command value $\omega 0^*$.

In the power output apparatus 110 of the second embodiment and the power output apparatus 110A given as its modified example, the planetary gear 120 is used as the three-shaft-type power input and output means. The planetary gear 120 may, however, be replaced by any other device or gear unit, for example, a differential gear, that enables determination of the powers input into and output from the residual one shaft based on the predetermined powers input into and output from any two shafts among the three shafts.

The present invention is not restricted to the above embodiments or applications, but there may be many modifications, changes, and alterations without departing from the scope or spirit of the main characteristics of the present invention.

The gasoline engines driven by means of gasoline are used for the engines 50 and 150 in the first and the second embodiments discussed above. The principle of the invention is, however, applicable to other internal combustion engines and external combustion engines, such as Diesel engines, turbine engines, and jet engines.

Transistor inverters are used for the driving circuits 92 and 192 in the first and the second embodiments. Other available examples include IGBT (insulated gate bipolar mode transistor) inverters, thyristor inverters, voltage PWM (pulse width modulation) inverters, square-wave inverters (voltage inverters and current inverters), and resonance inverters.

The batteries 94 and 194 may include Pb cells, NiMH cells, Li cells, or the like cells. A capacitor may be used in place of the battery 94 or the battery 194.

Although the power output apparatus 10 or 110 is mounted on the vehicle in both the first and the second embodiments, it may be mounted on other transportation means like ships and airplanes as well as a variety of industrial machines.

It should be clearly understood that the above embodiments discussed above are only illustrative and not restrictive in any sense. The scope and spirit of the present invention are limited only by the terms of the appended claims.

What is claimed is:

1. A power output apparatus for outputting power to a drive shaft, said power output apparatus comprising:

an engine having an output shaft;

a complex motor comprising a stator having multi-phase coils wound thereon, a first rotor connecting with said output shaft of said engine, and a second rotor connecting with said drive shaft, wherein said stator and said first rotor constitute a first motor that can carry out a regenerative operation and said stator and said second rotor constitute a second motor, at least either one of said first motor and said second motor being constructed as a non-synchronous motor;

a motor-driving circuit for regulating an exciting electric current flown through said multi-phase coils wound on said stator of said complex motor, thereby driving said first motor and said second motor in said complex motor; and control means for driving and controlling said first motor and said second motor via said motor-driving circuit, so as to enable at least part of power output from said engine to be output to said drive shaft.

2. A power output apparatus in accordance with claim 1, wherein said control means comprises means for controlling said first motor and said second motor, in order to enable said first motor to regenerate at least part of the power output from said engine as an electromagnetic energy and in order to enable said second motor to be driven with at least part of the regenerative electromagnetic energy.

3. A power output apparatus in accordance with claim 1, wherein said second motor in said complex motor is constructed as a non-synchronous motor, and said first motor in said complex motor is constructed as a non-synchronous motor having specific torque-slip characteristics that give a higher torque than that of said second motor at a slip in a predetermined range.

4. A power output apparatus in accordance with claim 3, wherein said predetermined range is a range in the vicinity of a value '1', said power output apparatus further comprising:

starting time control means activated in place of said control means when a predetermined starting instruction is given while both said output shaft of said engine and said drive shaft are at a stop, said starting time control means controlling said first motor and said second motor via said motor-driving circuit, in order to enable said first motor to output a torque for rotating and driving said output shaft of said engine and in order to enable said second motor to output a torque of not greater than a predetermined value.

5. A power output apparatus in accordance with claim 4, wherein said predetermined value represents a value of a torque corresponding to a stationary friction of said drive shaft.

6. A power output apparatus in accordance with claim 1, said power output apparatus further comprising:

reverse time control means for, when an instruction is given to rotate said drive shaft in reverse of a rotation of said output shaft, regulating said motor-driving circuit, so as to invert a phase sequence of an exciting electric current flown through said multi-phase coils wound on said stator of said complex motor.

7. A power output apparatus in accordance with claim 6, wherein said second motor in said complex motor is constructed as a non-synchronous motor, and said reverse time control means comprises means for regulating the exciting current in order to keep a slip in a range of 0 to 1 while said second motor is driven to carry out a power operation in a reverse direction.

8. A power output apparatus in accordance with claim 1, wherein said second motor in said complex motor is constructed as a motor that can carry out a regenerative operation, said power output apparatus further comprising:

braking time control means for, when an instruction is given to brake said drive shaft, regulating an exciting electric current flown through said multi-phase coils wound on said stator of said complex motor via said motor-driving circuit, so as to enable a braking force to be applied to said drive shaft through the regenerative operation of said second motor in said complex motor.

9. A power output apparatus for outputting power to a drive shaft, said power output apparatus comprising:

an engine having an output shaft;

a complex motor comprising a stator having multi-phase coils wound thereon, a first rotor connecting with a rotating shaft, and a second rotor connecting with either one of said output shaft of said engine and said drive shaft, wherein said stator and said first rotor constitute a first motor that can carry out a regenerative operation and said stator and said second rotor constitute a second motor, at least either one of said first motor and said second motor being constructed as a non-synchronous motor;

three-shaft-type input and output means having three shafts respectively connecting with said output shaft, said rotating shaft, and said drive shaft, said three-shaft-type input and output means determining powers input into and output from a residual one shaft based on predetermined powers input into and output from any two shafts among said three shafts;

a motor-driving circuit for regulating an exciting electric current flown through said multi-phase coils wound on said stator of said complex motor, thereby driving said first motor and said second motor in said complex motor; and control means for driving and controlling said first motor and said second motor via said motor-driving circuit, so as to enable said three-shaft-type power input and output means and said first motor and said second motor in said complex motor to output at least part of power output from said engine to said drive shaft.

* * * * *